(12) United States Patent
Goodsitt et al.

(10) Patent No.: US 12,406,248 B2
(45) Date of Patent: Sep. 2, 2025

(54) SYSTEMS AND METHODS FOR AUTHORIZING A TRANSFER

(71) Applicant: Capital One Services, LLC, McLean, VA (US)

(72) Inventors: Jeremy Goodsitt, Champaign, IL (US); Galen Rafferty, Mahomet, IL (US); Samuel Sharpe, Cambridge, MA (US); Grant Eden, San Francisco, CA (US); Austin Walters, Columbia, TN (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 19 days.

(21) Appl. No.: 18/506,168

(22) Filed: Nov. 10, 2023

(65) Prior Publication Data

US 2025/0156840 A1 May 15, 2025

(51) Int. Cl.
*G06Q 20/34* (2012.01)
*G06F 3/01* (2006.01)
*G06Q 20/40* (2012.01)

(52) U.S. Cl.
CPC ............. *G06Q 20/34* (2013.01); *G06F 3/017* (2013.01); *G06Q 20/405* (2013.01)

(58) Field of Classification Search
None
See application file for complete search history.

(56) References Cited

U.S. PATENT DOCUMENTS

| | | |
|---|---|---|
| 6,988,657 B1 | 1/2006 | Singer et al. |
| 8,285,329 B1 | 10/2012 | Zhu |
| 8,615,465 B2 | 12/2013 | Boutcher et al. |
| 9,043,224 B2 | 5/2015 | Simmons |
| 9,355,424 B2 | 5/2016 | Candelore et al. |
| 9,710,804 B2 | 7/2017 | Zhou et al. |
| 9,830,589 B2 | 11/2017 | Xing |
| 9,947,006 B2 | 4/2018 | Mestre et al. |

(Continued)

FOREIGN PATENT DOCUMENTS

CN 112805735 A 5/2021

OTHER PUBLICATIONS

International Search Report and Written Opinion in related PCT Application No. PCT/US2024/055049 mailed Mar. 3, 2025.

*Primary Examiner* — Kristy A Haupt
(74) *Attorney, Agent, or Firm* — TROUTMAN PEPPER LOCKE LLP; Christopher J. Forstner; John A. Morrissett

(57) ABSTRACT

Disclosed embodiments may include systems and methods for utilizing gesture-based transaction cards. Examples include: first, using a mobile device to preauthorize transaction cards to enter an unlocked state before making a purchase by making a gesture with the transaction card toward the mobile device. Second, using a first transaction card to change an authorization condition of a second transaction card associated with the same account by making a gesture from the first transaction card to the second transaction card. Third, using a first transaction card to distribute a predebited virtual card to the user device of a second user by making a gesture from the first transaction card to the user device of the second user. Additionally, the primary user may be able to upload new authorization conditions to the transaction card and control the system through a related mobile application on a connected mobile device.

20 Claims, 11 Drawing Sheets

(56) References Cited

U.S. PATENT DOCUMENTS

| | | |
|---|---|---|
| 10,026,076 B2 | 7/2018 | Kumar et al. |
| 10,438,437 B1 | 10/2019 | Herrington et al. |
| 10,453,052 B2 | 10/2019 | Wurmfeld et al. |
| 10,475,025 B2 | 11/2019 | Zarakas et al. |
| 10,510,074 B1 | 12/2019 | Rule et al. |
| 10,511,443 B1 | 12/2019 | Newman et al. |
| 10,565,587 B1 | 2/2020 | Newman et al. |
| 10,783,736 B1 | 9/2020 | Herrington et al. |
| 10,810,579 B2 | 10/2020 | Wyatt |
| 10,839,371 B1 | 11/2020 | Vukich |
| 11,250,417 B2 | 2/2022 | Yoo |
| 2010/0312700 A1 | 12/2010 | Coulter |
| 2013/0297425 A1 | 11/2013 | Wallaja |
| 2015/0262161 A1 | 9/2015 | McMullan et al. |
| 2017/0154328 A1 | 6/2017 | Zarakas et al. |
| 2019/0156034 A1 | 5/2019 | Kedem et al. |
| 2019/0287083 A1* | 9/2019 | Wurmfeld ............ G06Q 20/306 |
| 2019/0318345 A1 | 10/2019 | Kallugudde |
| 2020/0364716 A1* | 11/2020 | Pickering ............... G06V 40/10 |
| 2020/0387894 A1 | 12/2020 | Shakkarwar |
| 2021/0012339 A1 | 1/2021 | Rafferty et al. |
| 2021/0019734 A1 | 1/2021 | Vukich et al. |
| 2021/0201296 A1 | 7/2021 | Rule et al. |
| 2021/0342809 A1 | 11/2021 | Rule et al. |
| 2021/0342816 A1 | 11/2021 | Benkreira et al. |
| 2022/0237591 A1* | 7/2022 | Omojola ............ G06K 19/0723 |
| 2023/0419324 A1* | 12/2023 | Vargas .................. G07F 7/0873 |

\* cited by examiner

SYSTEMS AND METHODS FOR AUTHORIZING A TRANSFER

CROSS-REFERENCE TO RELATED APPLICATIONS

This application relates to U.S. patent application Ser. No. 18/506,165, filed Nov. 10, 2023, bearing, listing Jeremy Goodsitt, Galen Rafferty, Samuel Sharpe, Brian Barr, Grant Eden, and Austin Walters as inventors, and entitled "Systems and Methods for Preauthorizing Transaction Cards," and U.S. patent application Ser. No. 18/506,178, filed Nov. 10, 2023, bearing, listing Jeremy Goodsitt, Galen Rafferty, Samuel Sharpe, Brian Barr, Grant Eden, Austin Walters, and Anh Truong as inventors, and entitled "Systems and Methods for Sharing a Virtual Card," the entire contents of each of which are hereby incorporated by reference in its entirety as if fully set forth herein.

FIELD

The disclosed technology relates to systems and methods for utilizing gesture-based transaction cards. Specifically, the disclosed technology relates to utilizing transaction cards and associated mobile devices to preauthorize transactions, change authorization conditions of a related second transaction card, and distribute a virtual card to the user device of a second user.

BACKGROUND

Shoppers frequently tap, insert, or swipe at payment terminals with transaction cards in order to receive goods and services from merchants rather than pay with cash. Generally, transaction cards are limited to paying at a merchant terminal by providing a terminal with a user's account information. Such cards can have significant issues with theft, fraud, and security attacks especially if complicated by human factors, such as if the card is misplaced or if the account information contained on the card or associated with the card is disclosed. Because of this it can also be difficult or unsafe to share transaction cards with friends and family.

Accordingly, there is a need for transaction cards with additional features for users and new methods to prevent fraud. Embodiments of the present disclosure are directed to this and other considerations.

SUMMARY

Disclosed embodiments may include a computing device for preauthorizing transactions. The computing device may include one or more processors, memory in communication with the one or more processors and storing instructions that are configured to cause the computing device to preauthorize a transaction card. The computing device may receive a card activation code. The computing device may also initialize and pair, using the card activation code, a card with the computing device, wherein the card is in a default locked state and unable to conduct transactions based on one or more locking conditions. Furthermore, the computing device may generate a graphical user interface indicating to a user that the card is activated. The computing device may also display the graphical user interface on a display of computing device. The computing device may receive a first signal to change the card to an unlocked state. In response to receiving the first signal, the computing device may transmit, to the card, an unlock authorization to change the card from the default locked state to the unlocked state, generate an updated graphical user interface indicating to the user that the card is unlocked, and display the updated graphical user interface on the display.

Disclosed embodiments may include a card that requires preauthorization prior to transactions. The card may include one or more antennas, one or more processors, memory in communication with the one or processors and storing instructions that are configured to cause the card to enter an unlocked state. The card may establish a connection with a mobile device via the one or more antennas. The card may also receive, from the mobile device, a first signal to change the card to an unlocked state capable of conducting a transaction from a default locked state incapable of conducting a transaction. In response to receiving the first signal to change the card to the unlocked state, the card may change from the default locked state to the unlocked state and determine whether a trigger event has occurred. In response to determining that the trigger event has occurred, the card may change to the default locked state. Otherwise, the card may remain in the unlocked state, where the card may receive, from a first transaction terminal, a first transfer request and may transmit, to the first transaction terminal, a transfer authorization.

Disclosed embodiments may include a card that requires preauthorization prior to transactions. The card may include one or more antennas, one or more processors, memory in communication with the one or processors and storing instructions that are configured to cause the card to enter an unlocked state. The card may establish a connection with a mobile device via the one or more antennas. The card may also receive, from the mobile device, a first signal to change the card to an unlocked state capable of conducting a transaction from a default locked state incapable of conducting a transaction. In response to receiving the first signal to change the card to the unlocked state, the card may change from the default locked state to the unlocked state, and receive, from a first transaction terminal, a first transfer request. In response to the card being in the unlocked state, the card may transmit, to the first transaction terminal, a transfer authorization. In response to transmitting the transfer authorization, the card may change from the unlocked state to the default locked state.

Disclosed embodiments may include a first card for authorizing a transfer. The first card may include one or more antennas, one or more processors, memory in communication with the one or processors and storing instructions that are configured to cause the first card to receive, from a second card, the second card associated with a same account as the first card, a first signal and a gesture. The first signal may comprise authorization information relating to account information. The first card may authenticate the first signal using the account information. The first card may determine, from the gesture and the account information, authorization conditions. The first card may change an authorization limitation of the first card based on the authorization conditions; receive, from a first terminal, a first transfer request; and responsive to the first card having the authorization limitation, transmit, to the first terminal, a transfer authorization.

Disclosed embodiments may include a computing device for authorizing a transfer. The computing device may include a display, one or more processors, memory in communication with the one or processors and storing instructions that are configured to cause the computing device to generate a first graphical user interface asking a user to set authorization conditions for a card related to an account. The computing device may display the first graphical user interface on the display of the computing device. The computing device may also receive, from a first user, authorization conditions and a selection of a gesture from one or more gestures. The computing device may additionally generate a second graphical user interface, showing the authorization conditions, the authorization conditions indicating an authorization limitation for the card. Furthermore, the computing device may display the second graphical user interface on the display. Also, the computing device may detect a first gesture. The computing device may identify whether the first gesture corresponds to the gesture selected. In response to identifying the first gesture corresponds with the selected gesture, the computing device may transmit the authorization conditions to the card.

Disclosed embodiments may include a first computing device for authorizing a transfer. The first computing device may include one or more processors, memory in communication with the one or processors and storing instructions that are configured to cause the first computing device to receive, from a second computing device, the second computing device associated with a same account as the first computing device, a first signal and a gesture. The first signal may comprise authorization information relating to account information. The first computing device may send, to a server, the gesture and the account information. The first computing device may receive, from the server, first authorization conditions and a first authorization limitation. Additionally, the first computing device may receive, from a first terminal, a first transfer request. In response to the first computing device having the necessary authorization limitation, the first computing device may transmit, to the first terminal, a first transfer authorization.

Disclosed embodiments may include a card used for sharing a virtual card. The card may include one or more antennas, one or more processors, memory in communication with the one or processors and storing instructions that are configured to cause the card to receive, from a first user device associated with a same account as the card, first gesture data. The card may determine whether the first gesture data matches a first stored gesture of one or more stored gestures. In response to determining that the first gesture data matches the first stored gesture, the card may: receive, from the first user device, configuration information relating to predebited virtual card information and a second stored gesture, receive, second gesture data from a second user device, and determine whether the second gesture data matches the second stored gesture of the one or more stored gestures. In response to determining that the second gesture data matches the second stored gesture, the card may transmit, to the second user device, the predebited virtual card information based on the configuration information.

Disclosed embodiments may include a first computing device used for sharing a virtual card. The first computing device may include, a display, one or more processors, memory in communication with the one or processors and storing instructions that are configured to cause the first computing device to generate a first graphical user interface indicating for a first user to select configuration information associated with an account of the first user comprising predebited virtual card information, a card amount, and one or more stored gestures. The first computing device may display the first graphical user interface on a display. The first computing device may also receive, from the first user, the configuration information. The first computing device additionally may receive, from the one or more sensors, first gesture data. Furthermore, the first computing device may determine that the first gesture data matches a stored gesture of the one or more stored gestures. In response to determining that the first gesture data matches the stored gesture, the first computing device may: transmit, to a second computing device associated with a second user, the predebited virtual card information and transmit, to a server, the predebited virtual card information comprising the card amount to be charged to the account.

Disclosed embodiments may include a computing device associated with a first user used for sharing a virtual card. The computing device may include, a display, one or more processors, memory in communication with the one or processors and storing instructions that are configured to cause the computing device to receive, from a card associated with an account of a second user, predebited virtual card information comprising an amount. The computing device may send, to a server, the predebited virtual card information for activating a predebited virtual card associated with the predebited virtual card information. The computing device may receive, from the server, authorization information regarding the amount. Furthermore, the computing device may generate a first graphical user interface showing the predebited virtual card information, the authorization information, and the amount. Additionally, the computing device may display the first graphical user interface on a display. The computing device may receive, from a first terminal, a first transfer request. Finally, the computing device may transmit, to the first terminal, a first transfer authorization.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
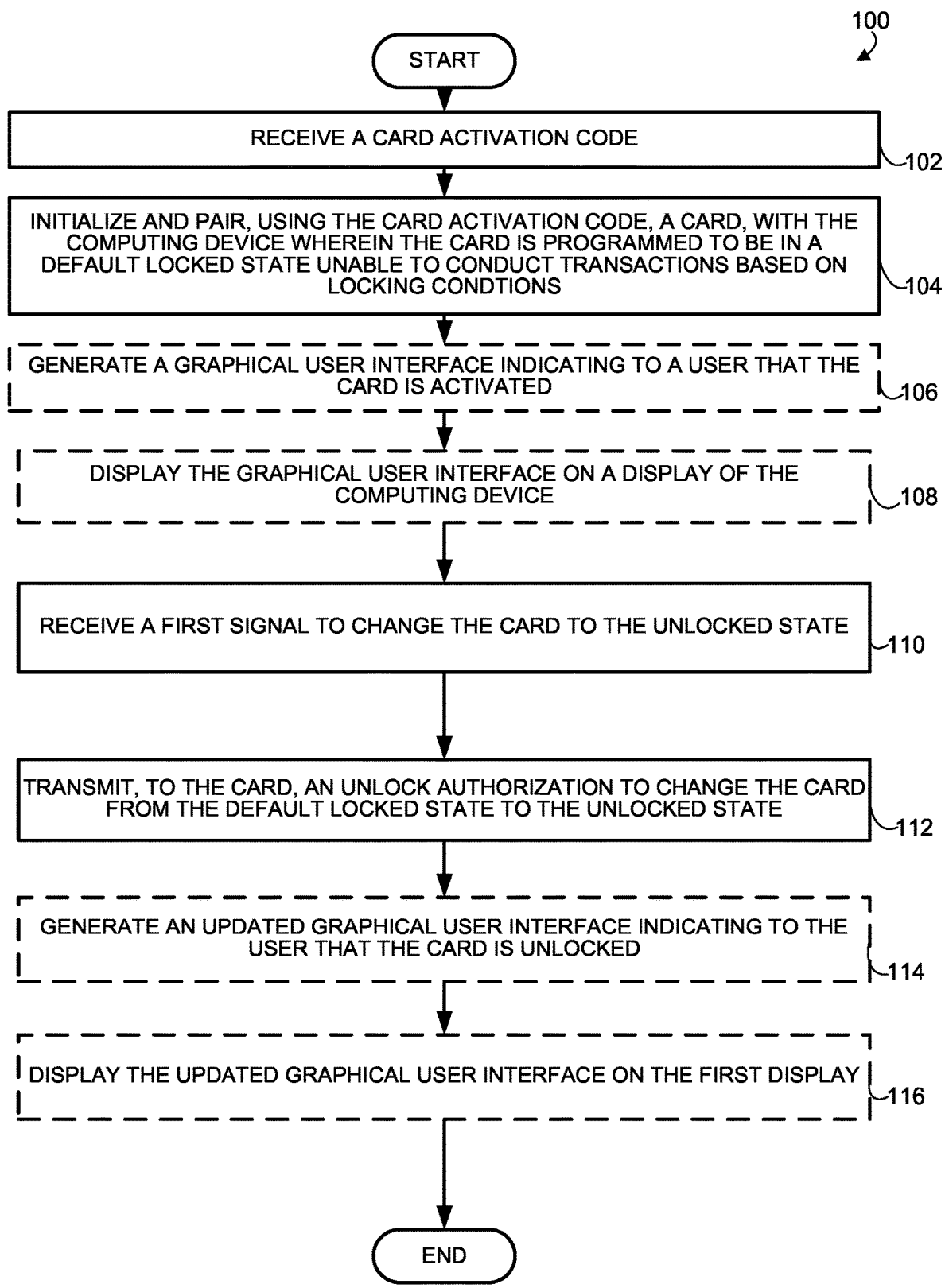
FIG. 1 is a flow diagram illustrating an exemplary method for preauthorizing transaction cards in accordance with certain embodiments of the disclosed technology.

The disclosed technology relates to systems and methods for utilizing gesture-based transaction cards. This may allow transaction cards and/or associated mobile devices to have more features than would be otherwise typical (e.g., perform more actions besides participating in transactions). Such features may be directed to increasing security or preventing fraud. For example, the card may exist in a locked (e.g., unusable state). The card may be unlocked (and able to be used for transactions) after being tapped (or another gesture is made) to an associated mobile device. The card may resume a locked state after being used for a transaction, which increases security.

Additionally, a first transaction card may make a gesture to an associated second transaction card to change a feature of one or both transaction cards. For example, the first transaction card may be tapped to the second transaction card to temporarily raise the limit of the second transaction card (e.g., when the first user associated with the first transaction card gives the second user associated with the second transaction card permission to make a unique high-cost purchase they would not ordinary make, like a new television). This new enhanced feature of transaction cards enhances the control the users have over the card.

Furthermore, a first transaction card may make a gesture to a device associated with a second user and, in the process, may share a virtual card with the second user's device. The virtual card may then be debited or charged directly against the account of the first transaction card. This allows a primary user to share funds with a second user without having the potential security risk of sharing their primary card information or access to their primary card account with the second user.

Examples of the present disclosure related to systems and methods for gesture-based transaction cards. More particularly, the disclosed technology relates to a system for preauthorizing transaction cards using a mobile device, authorizing a transfer on a second card using a first card or mobile device, or sharing a virtual card to a mobile device using a transaction card. The systems and methods described herein utilize, in some instances, interactive and dynamic graphical user interfaces, which are necessarily rooted in computers and technology. Graphical user interfaces are a computer technology that allows for user interaction with computers through touch, pointing devices, or other means. The present disclosure details the use of a user device, for example a smartphone, which is used to modify the gestures or card options used by the card to complete certain actions. This, in some examples, may involve receive touch input from the user to dynamically change the graphical user interface to display the different gestures or card options to apply to the card. Using a graphical user interface in this way may allow the system to demonstrate to the user how the card is to be used and changed. Furthermore, the graphical user interface may display current information about the card and related cards on the account in real-time, such as charges, ledgers, and amounts. This is a clear advantage and improvement over prior technologies because the graphical user interface on the user device allows the user to interact with and personalize the card to their individual wants and desires by packaging together different commands and instructions using the graphical user interface. The user device then can relay the data gathered from the graphical user interface with instructions regarding gestures so that the card can then perform in the manner as shown by the graphical user interface. This allows for significantly more flexibility than current transaction cards, which don't allow for user customization of gesture actions to this extent.

The systems and methods described herein may also utilize, in some instances, machine learning models, which are necessarily rooted in computers and technology. Machine learning models are a unique computer technology that involves training models to complete tasks and make decisions. This, in some examples, may involve using a machine learning model that determines an ideal card configuration for a user by analyzing a user's daily routine. Using a machine learning model in this way may allow the system to automatically figure out the best situations to lock a user's card without the user having to specifically setup certain times to lock and unlock the card. This avoids the user having to manually enter card setup commands.

Furthermore, examples of the present disclosure also improve transaction security. By having a user unlock the card using a gesture with the mobile device prior to the transaction, and then the card returning to the locked state afterwards, the card is more secure against hackers. Similarly, having one user of the account make a gesture using their card to a second card on the account to increase the spending limit on the second card is more secure as a smaller limit can be used on a regular basis (in case the card is stolen) and the larger limit can only be used for larger purchases where both users are around or aware of the purchase. Additionally, using card gestures to distribute predebited virtual cards to other users is more secure than adding additional users to an account, since predebited virtual cards are separated from the main user's account. Overall, the systems and methods disclosed have significant practical applications in the transaction card field because of the noteworthy improvements further described above and further herein, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 2:
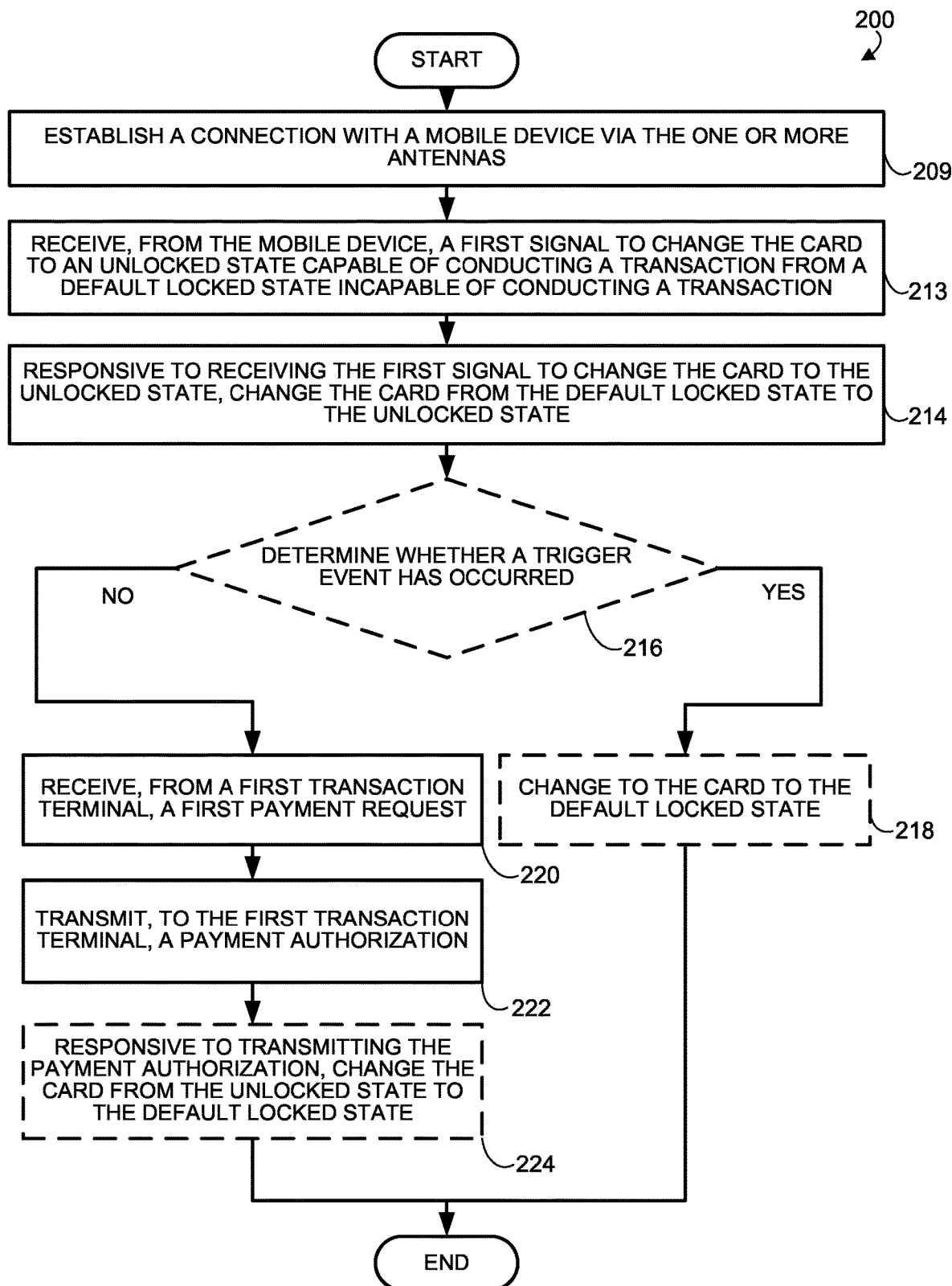
FIG. 2 is a flow diagram illustrating an exemplary method for preauthorizing transaction cards in accordance with certain embodiments of the disclosed technology.

FIGS. 1 and 2 may describe a system for preauthorizing transaction card using a mobile device. This may involve first pairing a card to a mobile device and uploading locking conditions. Once the locking conditions are uploaded to the card, the card may interact with the mobile device to be unlocked prior to use or locked in response to events occurring that trigger the locking conditions.

FIG. 1 is a flow diagram illustrating an exemplary method 100 for preauthorizing transaction cards, in accordance with certain embodiments of the disclosed technology. The steps of method 100 may be performed by one or more components of the system 400 (e.g., authorization system 320 or web server 410 of transaction approval system 408 or user device 402), as described in more detail with respect to FIGS. 3 and 4.

In block 102, the authorization system 320 may receive a card activation code (e.g., a pseudorandom alphanumeric code). The authorization system 320 may operate on a user device 402. The card activation code may be an activation code generally and may be used for activating more than just a transaction card. The activation code may also be used to activate a wide variety of payment instruments (e.g., credit card, debit cards, gift cards, smart watches, mobile devices, NFC bracelets, keyrings/fobs, etc.). A card activation server may send the card activation code to authorization system 320. The card activation code may contain encrypted data or a cryptogram that can be used to activate the card. The user device 402 may be able to store a card activation code for later activation. The user device 402 may also be able to generate a card activation code instead of receiving it from elsewhere. The card activation code may be related to an application or an account on the user device (e.g., a mobile application, such as a banking application). The mobile application may include a graphical user interface that may be presented to the user using the display of user device 402. The user device 402 may receive instructions from the user via the graphical user interface. The mobile application may be used to control aspects of the user's account and/or devices connected to the account.

In block 104, the authorization system 320 may initialize and pair, a card 403 with the user device (computing device) 402, wherein the card is in a default locked state and unable conduct transactions based on one or more locking conditions. The card 403 may arrive in an uninitialized starting state. To initialize the card 403, the authorization system 320, may instruct user device 402 to send an initialization signal to the card 403. The initialization signal may be sent to the card 403 using NFC communication, Bluetooth communication, QR code scans, or barcode scans. This initialization signal may contain the card activation code received or generated in block 102. The initialization signal may also serve to pair the card 403 to the user device 402 or to a mobile application related to the card 403 activation code and authorization system 320. The initialization signal may create a controller and agent relationship between the mobile application on user device 402 and the card 403, where the mobile application is a controller, and the card 403 is the agent. The card 403 may be connected to a specific user account of the mobile application on the user device 402. The initialization signal may initialize the card without requiring internet or network access.

Accordingly, the initialization signal may contain setup instructions to put the card 403 in a default locked state. The default locked state may mean that the card 403 is incapable of making transactions without receiving a unlock signal from the mobile application on the user device 402. This step may increase security of the card 403 because it would require a user to preauthenticate purchases on their mobile device before using their card. Alternatively, the initialization signal may contain instructions to put the card in a default unlocked state, which may mean that the card would be capable of making transactions once receiving the initialization signal.

Additionally, the initialization signal may include one or more locking conditions. Locking conditions may be rules or conditions chosen by a user using a graphical user interface of the mobile application on user device 402. The related mobile application (or authorization system 320) on user device 402 may generate a graphical user interface showing a number of configurable locking conditions. This graphical user interface may be presented to the user via a display of user device 402. The locking conditions can be simple or complex. For example, the user device 402 may receive an option selected by the user using the graphical user interface to unlock the card for a set amount of time. The amount of time may be automatic or set by the user (e.g., 1 minute, 5 minute, 20 minutes, 1 hour). Other options for the locking conditions include situations where the card 403 is unlocked automatically during certain times of the day, when the user device 402 or card 403 is in certain locations (e.g., if the user device 402 or card 403 is equipped with GPS or location services via cellular data or WiFi™), where the card can be a certain distance from the phone, where the card can only be used in certain orientations or only during certain acceleration and movement scenarios (e.g., card is not moving rapidly). The locking conditions may only apply to certain merchants. The user device 402 receives the selection of the user via the graphical user interface, the authorization system 320 may store the locking conditions to send to the card at a later time if the card has not been initialized. During setup, the user device may receive selections of locking conditions from the user via the graphical user interface, and the authorization system 320 may include one or more locking conditions in the initialization signal sent to the card when the card 404 is paired with the user device 402. The card 403 may initialize with standard preset locking conditions if the user device does not receive custom locking conditions from the user within a predetermined time threshold or if the GUI does not include an option to change the locking conditions. The default, or preset condition of the card may be that the card is always locked unless unlocked by the user.

The disclosed system is not limited solely to operating with cards. User device 402 may pair or be initialized with a variety of payment instruments (e.g., credit card, debit cards, gift cards, smart watches, NFC bracelets, keyrings/fobs, virtual cards on a smart phone, etc.) using authorization system 320. These various payment instruments may be initialized in a similar way as described with card 403 above. For brevity, descriptions herein will refer to a card 403, but any payment instrument can be used in lieu of a card.

Cards 403 may be powered (and contain a battery and/or capacitor) or unpowered (and require a power source, such as inductive power). In the case of powered cards 403, the card may not need to be near the user device in order to receive and transmit signals to the user device regarding locking, unlocking, and initializing. In the case of unpowered cards 403, the cards 403 may need to be near the user device in order to receive and transmit signals to the user device regarding locking, unlocking, and initializing. For example, with an unpowered card, the card may receive power from being close to or contacting the user device 402 due to inductive coupling via induced magnetic fields between the card 403 and user device 402. Therefore, the user may have to tap the unpowered card to the user device 403 in order for the card 403 to receive power, and then receive and transmit signals with the user device 402. Therefore, in this example, to initialize the card 403, a graphical user interface may include instructions to the user associated with the user device 402 and the card 403 that the user needs to tap the card 403 to the user device 402 to initialize the card 403. This would allow the card 403 to receive the power from the user device 402 for power and communicate with the phone to receive the initialization signals, activation code, and/or locking conditions. Powered and unpowered cards may transmit and receive signals with the user device via one or more short-range wireless communication protocols such as Bluetooth™, Wifi™, or NFC.

In optional block 106, the authorization system 320 may generate a graphical user interface indicating to a user that the card 403 is activated. The user device 402 may receive a signal from the card 403 indicating that the card has received the card activation code, initialization signal, and/or locking conditions. The card 403 may also indicate via the signal to the user device 402 that the card 403 has been activated. The user device 402 may relay this information to the authorization system 320, which may generate a graphical user interface using the information. The graphical user interface may include information about the card such as the card number, expiration date, and/or CVV code. The graphical user interface may generally indicate that the card 403 has been activated. The graphical user interface may indicate whether the card 403 is in a locked state or in an unlocked state.

In optional block 108, the authorization system 320 may direct the user device 402 to display the graphical user interface on a display of the user device 402. The graphical user interface may include an indication to let the user know that the card 403 has been activated and may be used in conjunction with the mobile application related to the card 403. Alternatively or additionally, the user device 402 may display the GUI to the user a notification, alert, or message. In response to the card being activated, the user device 402 may also vibrate or send a haptic signal to the user to let the user know that the card 403 has been activated.

In block 110, the authorization system 320 may receive a first instruction from the user device 402 (e.g., the user device may receive a selection from the user via the graphical user interface) to change the card 403 to an unlocked state. The user, when deciding that they want to use the card 403, may use the user device 402 to send a signal to the card to change the card from the default locked state to an unlocked state. This may be completed via a short-range wireless protocol. This may require the user to use the mobile application on the user device 402 connected with the card 403. The mobile application may contain a menu of card options (in the form of an interactive graphical user interface presented on the display) that allows the user to pick an option. The user device 402 may receive a signal from the user (via the graphical user interface displayed on the display) that indicates the user wants to unlock the card. This user input signal may be used by the user device and/or authorization system 320 to unlock the card so that the user can make a purchase with the unlocked card.

Responsive to receiving the first instruction, the authorization system 320 may complete the one or more of blocks 112, 114, and 116.

In block 112, the authorization system 320 may transmit, to the card 403, an unlock authorization to change the card 403 from the default locked state to the unlocked state. As a result of receiving the signal indicating that the user would like to unlock the card, the authorization system 320 may generate an unlock authorization, which may be a message, to transmit to the card 403. The authorization system 320 may transmit the unlock authorization to the card 403 using user device 402. In the case of a powered card 403, the user device 402 may transmit the unlock authorization to the card without the card being in close proximity to the user device. For example the powered card 403, may communicate with the user device 402 over short-range communication protocol that is not a near field communication. In the case of an unpowered card 403, the card 403 may need to be tapped to the user device 402 to receive the unlock authorization. In this scenario, the authorization system 320 may generate a graphical user interface at the same time the unlock authorization is generated and transmit it to the user device 402 for display to let the user know that the user needs to tap the card 403 to the user device 402 to unlock the card 403. The user device 402 may display the graphical user interface after the user selects to unlock the card 403. Once the user taps the card 403 to the user device 402, the user device 402 transmits the unlock authorization to card 403. As a result of receiving the unlock authorization, the card 403 unlocks and may store the unlock authorization and is otherwise ready for use to conduct a transaction.

In optional block 114, the authorization system 320 may generate an updated graphical user interface indicating to the user that the card 403 is unlocked. This may occur as a result of the authorization system 302, via the user device 402, receiving a signal from the card 403 that the unlock authorization was received successfully.

In optional block 116, the authorization system 320 may direct the user device 402 to display the updated graphical user interface on the display. The graphical user interface may be used in conjunction with the mobile application related to the card. Alternatively or in addition, the graphical user interface may be presented to the user on the user device 402 as a notification, alert, or message. The authorization system may also transmit instructions to the user device 402 causing it to vibrate or send a haptic signal to the user to let the user know that the card 403 has been activated.

The authorization system 320 may also include a machine learning model. The machine learning model may be used by the authorization system 320 to create or recommend locking conditions for the user based on the user's habits or daily routine. The machine learning model may be trained by data provided by other users and may be customized for a particular user. In one example, the machine learning model may be a classification model and use user characteristics from a population of users to infer recommendations about a particular user. In another example, the machine learning model may use sequential models or reinforcement learning strategies to create recommendations based on past user actions. For example, the user may travel through a part of town with a lot of pickpocketing in the morning between 8:30 and 9 on weekdays. The authorization system 320 may, using the machine learning model, recognize this activity as a particular time that the user may want to lock their card 403. The authorization system 320 may then either automatically create a locking condition for this scenario or generate and transmit a graphical user interface to user device 402 to prompt the user on whether to lock the card for weekday mornings. The user device 402 would then display the graphical user interface, and receive user input to accept or decline the locking condition within a threshold period of time, which the user device 402 would transmit to the authorization system 320 for feedback to the machine learning model.

The authorization system 320 may also generate an assortment of interactive graphical user interfaces that allow the user to change the state or behavior of the card via the display of the user device 402. The user may be able to change the state of the card using the graphical user interface from locked to unlocked and unlocked to locked. The graphical user interface may include options to change the account paired or mobile application paired with the card 403. The graphical user interface may also include an option to the user to change a virtual number used with the card. The graphical user interface may also include the option to the user to make new locking conditions and/or change existing locking conditions for the card.

Various graphical user interfaces are discussed above. They may include buttons, toggles, options, text field entries, sliders, drop down menus, and other ways to interact with the user device 402 and ultimately the authorization system 320 via the user device 402. These various forms of interaction (as well as others not mentioned) may enable the user device 402 to accept user input in a variety of ways so that a user can select or provide other input to the user device 402.

FIG. 2 is a flow diagram illustrating an exemplary method 200 for preauthorizing transaction cards, in accordance with certain embodiments of the disclosed technology. The steps of method 200 may be performed by one or more components of the system 400 (e.g., authorization system 320 or web server 410 of transaction approval system 408 or card 403), as described in more detail with respect to FIGS. 3 and 4A.

Method 200 of FIG. 2 may be complementary to method 100 of FIG. 1 as method 200 may be from the perspective of the card 403 instead of authorization system 320 operating on the user device 402. Method 200 may not include the blocks of method 100 related to initialization.

In block 209, the card 403 may establish a connection with a mobile device via the one or more antennas. As stated above, the card may be powered or unpowered. Connections for powered card may occur with the card being some distance from the user device 402. Unpowered cards may require the user to place the card 403 near the user device 402 in order to for the card to receive power from the user device 402 (via inductive coils) and establish a connection. Powered and unpowered cards may transmit and receive signals with the user device via short-range wireless communication protocols such as Bluetooth™, Wifi™, or NFC using the antennas in the cards 403.

In block 213, the card 403 may receive from the user device 402, a first signal, to change the card to an unlocked state capable of conducting a transaction from a default locked state incapable of conducting a transaction. The first signal may be an unlock authorization, which was described above in reference to block 112, which is not repeated herein for brevity. The unlock authorization may be completed using wireless means. This may be setup during initial pairing by utilizing a handshake for authorization. The unlock authorization may use authentication tokens specific to allowing communication between the user device 402 and the card 403. The unlock authorization may be encrypted. The signal may also include other information, for example, a length of time that the unlocked state is to last, a number of uses that the unlocked state is to endure for, a distance from the phone user device 402 that the card 403 can be before the unlocked state is reverted to the locked state.

In block 214, in response to receiving the first signal to change the card to the unlocked state, the card 403 may change from the default locked state to the unlocked state. After receiving the unlock authorization, the card 403 may scan and verify the authenticity of the data. This may involve confirming the encrypted data of the signal or unlock authorization is from user device 402 and/or the associated mobile application. The card 403 may then change from the default locked state, where no personal information can be accessed on the card, to the unlocked state, where the card can be used for transactions. The unlocked state may be limited in duration, number of uses, distance from the user device, or geographical area. The details regarding the unlocked state may be controlled by information in the first signal (unlock authorization) and changed on an unlock-by-unlock basis or may be limited and stored in the card memory.

In optional block 216, the card 403 may determine whether a trigger event has occurred. A trigger event may include an event that limits the unlocked state (for example, a limited in duration, number of uses, distance from the user device, or geographical area). A trigger event could be another event, such as an illicit attempt to read the card 403 (e.g., if the card detects with an accelerometer that it is in motion, for example, in a person's pocket, but it is attempting to be read by a card reader). Another example trigger event could be if a card 403 detects if it has been lost or stolen (e.g., if the card is equipped with global positioning system (GPS) chip, or can use cellular data or WiFi™ to determine its location is different from the location of the mobile device). This may be triggered if the card is greater than a threshold distance from the user device 402. The card 403 may be able to send frequent pings back to the user device 402 (e.g., if the card is powered and it was connected with the user device 402 via a short-range wireless communication protocol other than NFC). If the pings are unanswered after a threshold amount of time goes by, the card 403 may determine that it is too far away from the user device 402 or has lost contact with the user device 402. Additionally, the user device 402 may be able to send a signal to the card 403 to change the card to change the card to the default locked state. The user device 402 may also be able to indicate to the card 403 that other trigger events have occurred (e.g., if the user device 402 receives a message from a server (e.g., authorization system 320) that the account has been hacked, the card number has been stolen, etc.).

In optional block 218, in response to the card 403 determining that a trigger event has occurred, the card 403 may change to the default locked state. By determining that a trigger event has occurred, the card 403 may be in a situation that information could be compromised. Therefore, the card 403 may automatically revert to the locked state where no personal information or account information can be accessed on the card.

In response to determining the trigger event has occurred, the card 403 may also send a second signal to the mobile device indicating that a trigger event has occurred. This may indicate the nature of the trigger event (e.g., card dropped (signal picked up from accelerometer in card 403)). This may result in the creation of a GUI by authorization system 320 that may alert the user via the display of the user device 402 of the trigger event.

Otherwise, following the path to block 220, the card 403 may maintain an unlocked state, where the card may receive, from a transaction terminal, a first payment request. The transaction terminal may be a typical transaction terminal commonly found at merchants. The transaction terminal may accept payments using EMV chip standards or contactless EMV standards. When in the unlocked state, the card 404 may be generally used as a normal transaction card. Accordingly, the card may receive encrypted data from the transaction terminal.

In block 222, the card 403 may transmit, to the first transaction terminal, a payment authorization. After receiving the encrypted data from the transaction terminal, the card may transmit, to the transaction terminal, a payment authorization. The payment authorization may follow general transaction card payment standards, such as EMV chip standards or contactless EMV standards. The card may operate as a normal transaction card when unlocked.

In optional block 224, in response to transmitting the payment authorization, the card 404 may change from the unlocked state to the default locked state. By default, the card 404 may be setup so that unlocking the card 403 with the user device 402 would be sufficient for a single payment authorization. Therefore, after the transaction was completed, the card 403 would change from the unlocked state to the default locked state. However, this operation may be changed in the settings of the user device 402 and relayed to the card either upon initialization or when sending a signal to unlock the card 403. If the user attempted to use the card 403 at a second transaction terminal, and the card was not unlocked, the payment request would be declined. If the card was then sent a signal to unlock the card, then the user attempted to the use card 403 again at the transaction terminal, the payment request would be accepted and the transaction would go through.

The card 403 may have a secondary device that can be used to change the card from a locked state to an unlocked state. The secondary device (for example e.g., a smart bracelet) may contain a rudimentary or base configuration of the unlock authorization and may be able to transfer the unlock authorization to the card to allow it to be used in case the paired user device 402 is unusable. The secondary device may be paired to the card 403 by the user device 402. This provides the user a method to use the card 403 in case the user device 402 is inoperable or the battery in the user device 402 is dead.

Figure 3:
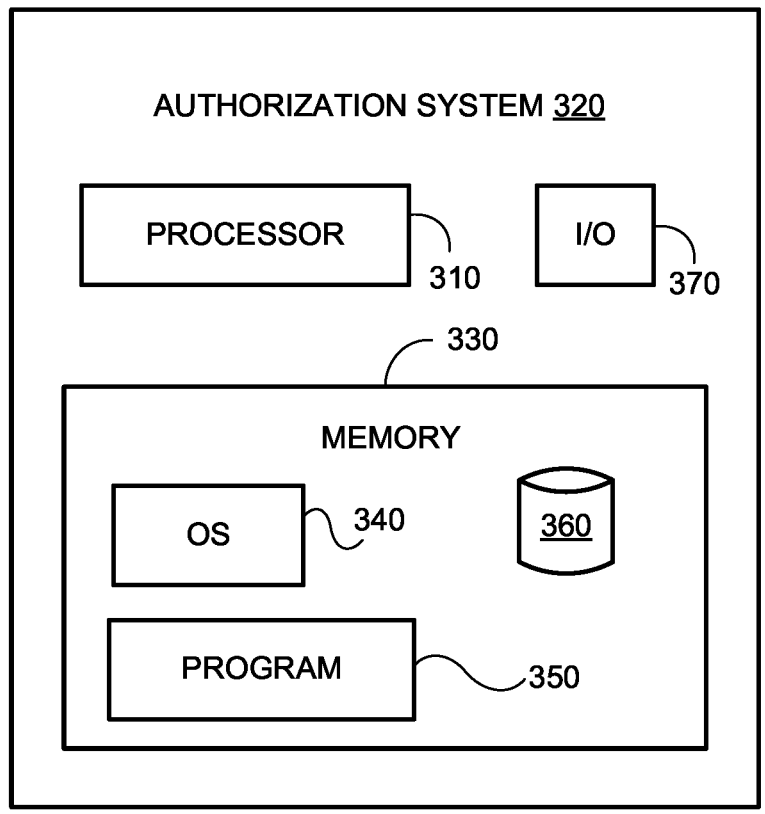
FIG. 3 is block diagram of an example authorization system used to preauthorize transaction cards, authorize a transfer, or share a virtual card, according to an example implementation of the disclosed technology.
Figure 4A:
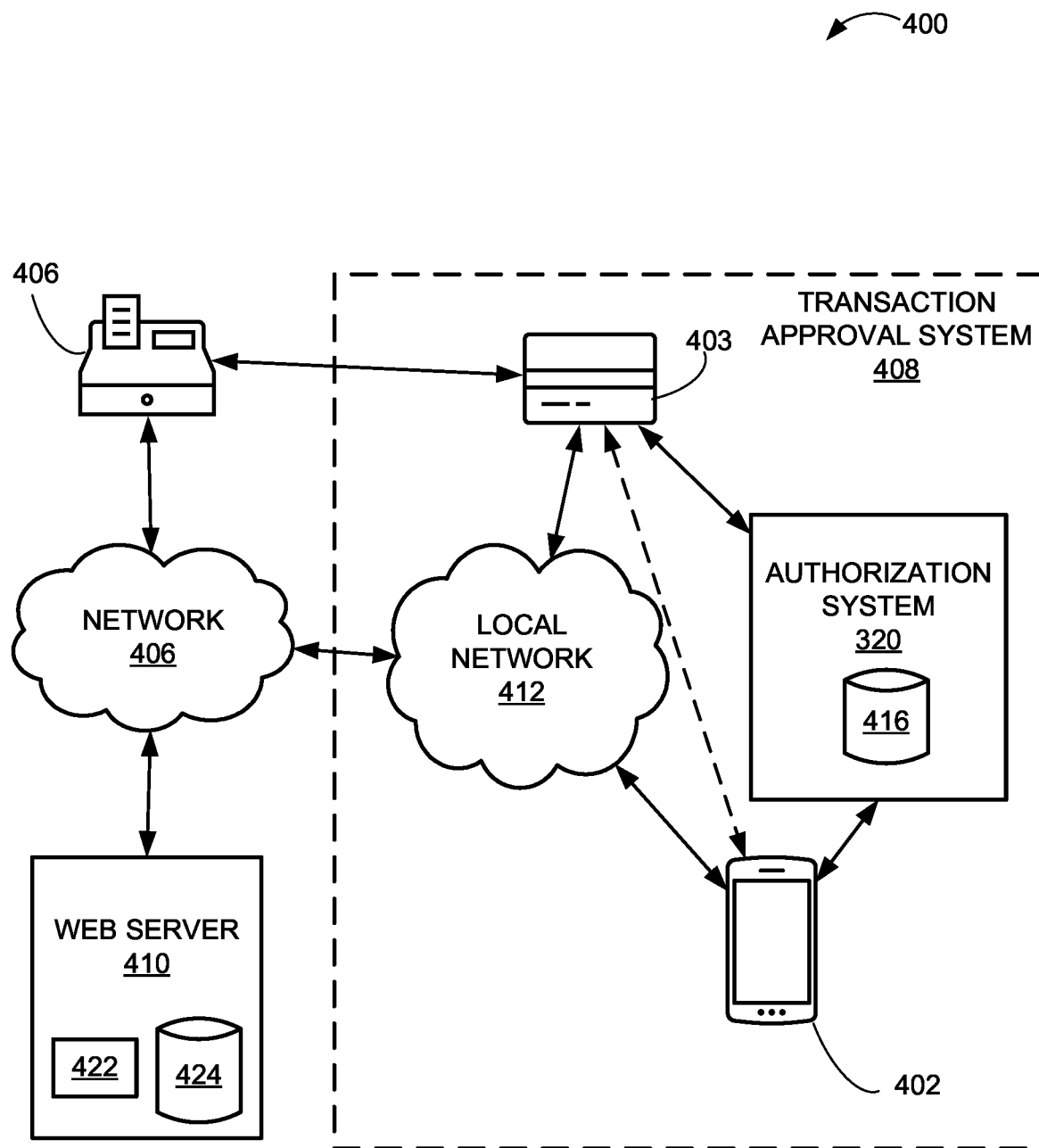
FIGS. 4A, 4B, and 4C are block diagrams of example transaction systems that may be used, according to an example implementation of the disclosed technology.
Figure 4B:
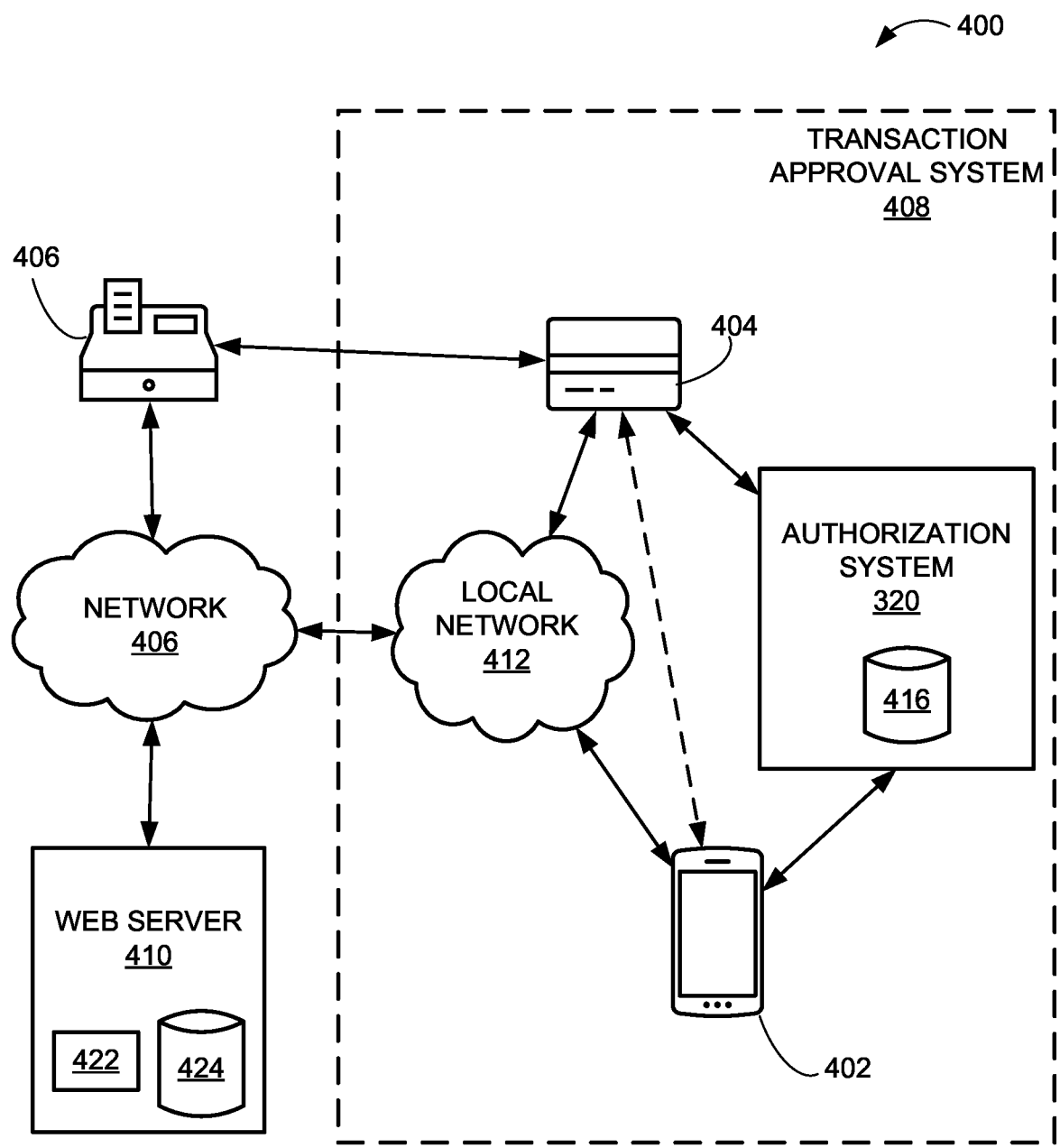
Figure 4C:
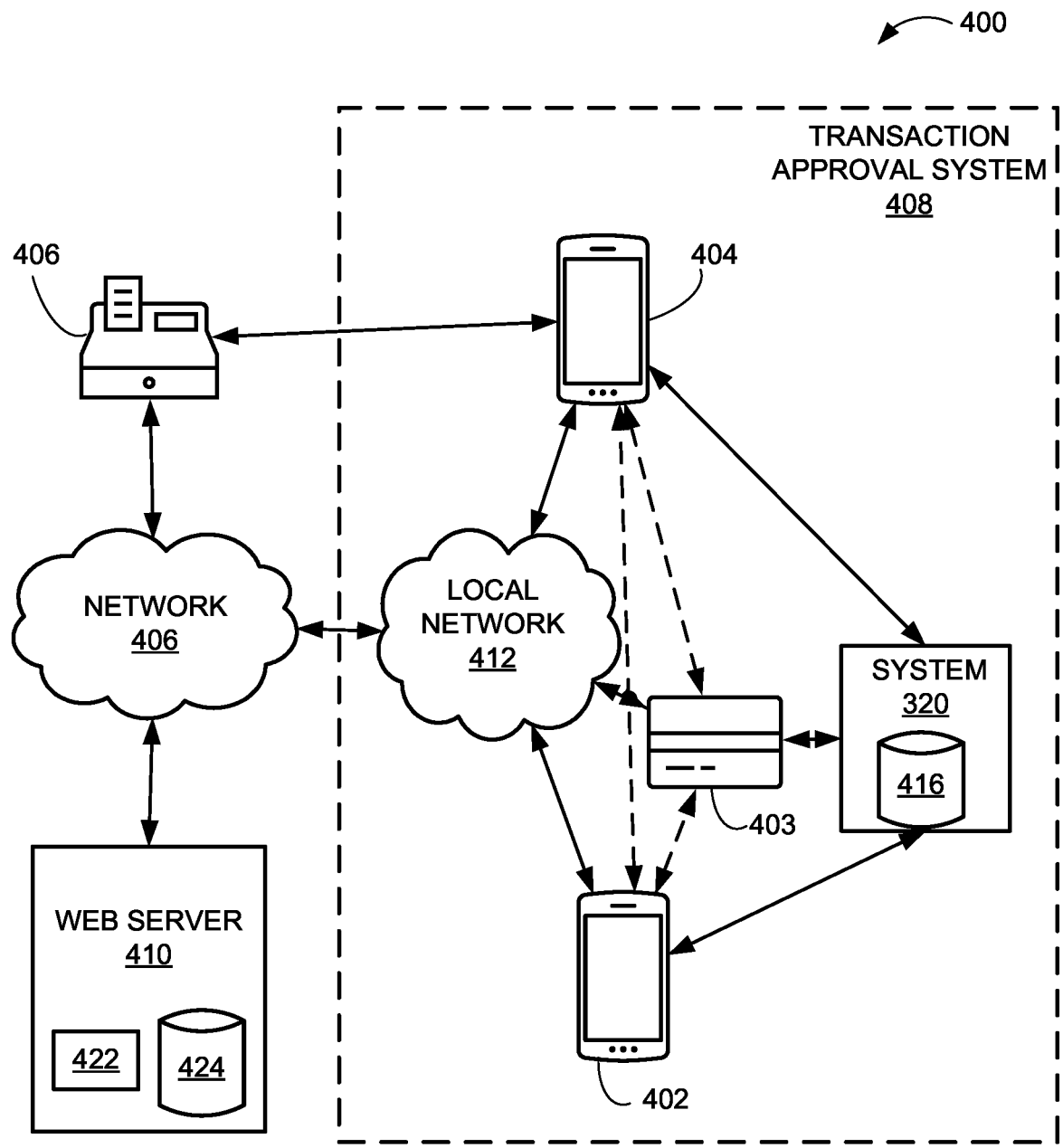

FIG. 3 is a block diagram of an example authorization system 320 used to interface with card 404 according to an example implementation of the disclosed technology. According to some embodiments, the user device 402 and web server 410, as depicted in FIGS. 4A, 4B, and 4C and described below, may have a similar structure and components that are similar to those described with respect to authorization system 320 shown in FIG. 3. As shown, the authorization system 320 may include a processor 310, an input/output (I/O) device 370, a memory 330 containing an operating system (OS) 340 and a program 350. In certain example implementations, the authorization system 320 may be a single server or may be configured as a distributed computer system including multiple servers or computers that interoperate to perform one or more of the processes and functionalities associated with the disclosed embodiments. In some embodiments authorization system 320 may be one or more servers from a serverless or scaling server system. In some embodiments, the authorization system 320 may further include a peripheral interface, a transceiver, a mobile network interface in communication with the processor 310, a bus configured to facilitate communication between the various components of the authorization system 320, and a power source configured to power one or more components of the authorization system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the authorization system 320 may include one or more storage devices configured to store information used by the processor 310 (or other components) to perform certain functions related to the disclosed embodiments. In one example, the authorization system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The authorization system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the authorization system 320 may include the memory 330 that may include one or more programs 350 to perform one or more functions of the disclosed embodiments. For example, in some embodiments, the authorization system 320 may additionally manage dialogue and/or other interactions with the customer via a program 350.

The processor 310 may execute one or more programs 350 located remotely from the authorization system 320. For example, the authorization system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include an authorization system database 360 for storing related data to enable the authorization system 320 to perform one or more of the processes and functionalities associated with the disclosed embodiments.

The authorization system database 360 may include stored data relating to status data (e.g., average session duration data, location data, idle time between sessions, and/or average idle time between sessions) and historical status data. According to some embodiments, the functions provided by the authorization system database 360 may also be provided by a database that is external to the authorization system 320, such as the database 416 as shown in FIGS. 4A, 4B, and 4C.

The authorization system 320 may also be communicatively connected to one or more memory devices (e.g., databases) locally or through a network. The remote memory devices may be configured to store information and may be accessed and/or managed by the authorization system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The authorization system 320 may also include one or more I/O devices 370 that may comprise one or more interfaces for receiving signals or input from devices and providing signals or output to one or more devices that allow data to be received and/or transmitted by the authorization system 320. For example, the authorization system 320 may include interface components, which may provide interfaces to one or more input devices, such as one or more keyboards, mouse devices, touch screens, track pads, trackballs, scroll wheels, digital cameras, microphones, sensors, and the like, that enable the authorization system 320 to receive data from a user (such as, for example, via the user device 402).

In examples of the disclosed technology, the authorization system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The authorization system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The authorization system 320 may be configured to adjust model parameters during training. Model parameters may include weights, coefficients, offsets, or the like. Training may be supervised or unsupervised.

While the authorization system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the authorization system 320 may include a greater or lesser number of components than those illustrated.

FIGS. 4A, 4B, and 4C are block diagrams of example systems that may be used to view and interact with transaction approval system 408, according to an example implementation of the disclosed technology. The components and arrangements shown in FIGS. 4A, 4B, and 4C are not intended to limit the disclosed embodiments as the components used to implement the disclosed processes and features may vary. As shown, transaction approval system 408 may interact with a user device 402 via a network 406. In certain example implementations, the transaction approval system 408 may include a local network 412, an authorization system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the transaction approval system 408. In some embodiments, the user device 402 may include or incorporate electronic communication devices for hearing or vision impaired users. The user device 402 may include some or all of the components of authorization system 320 and may perform some or all of the same functions as those described with respect to the authorization system 320. Transaction approval system 408 may also involve the use of a transaction card 403, or a second user device 404, which may be similar in hardware and/or software to user device 402, which may include some or all of the components of authorization system 320 and may perform some or all of the same functions as those described with respect to the authorization system 320. User devices 402, 403, 404 may be mobile devices (e.g., smartphones) or transaction cards, depending on the embodiment of transaction approval system 408.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the transaction approval system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The authorization system 320 may include programs (scripts, functions, algorithms) to configure data for visualizations and provide visualizations of datasets and data models on the user device 402. This may include programs to generate graphs and display graphs. The authorization system 320 may include programs to generate histograms, scatter plots, time series, or the like on the user device 402.

The network 406 may be of any suitable type, including individual connections via the internet such as cellular or WiFi™ networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The transaction approval system 408 may be associated with and optionally controlled by one or more entities such as a business, corporation, individual, partnership, or any other entity that provides one or more of goods, services, and consultations to individuals such as customers. In some embodiments, the transaction approval system 408 may be controlled by a third party on behalf of another business, corporation, individual, or partnership. The transaction approval system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the authorization system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi™, Bluetooth™, Ethernet, and other suitable network connections that enable components of the transaction approval system 408 to interact with one another and to connect to the network 406 for interacting with components in the system 400 environment. In some embodiments, the local network 412 may include an interface for communicating with or linking to the network 406. In other embodiments, certain components of the transaction approval system 408 may communicate via the network 406, without a separate local network 406.

The transaction approval system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access transaction approval system 408 using the cloud computing environment. User device 402 may be able to access transaction approval system 408 using specialized software. The cloud computing environment may eliminate the need to install specialized software on user device 402.

In accordance with certain example implementations of the disclosed technology, the transaction approval system 408 may include one or more computer systems configured to compile data from a plurality of sources the authorization system 320, web server 410, and/or the database 416. The authorization system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Figure 5:
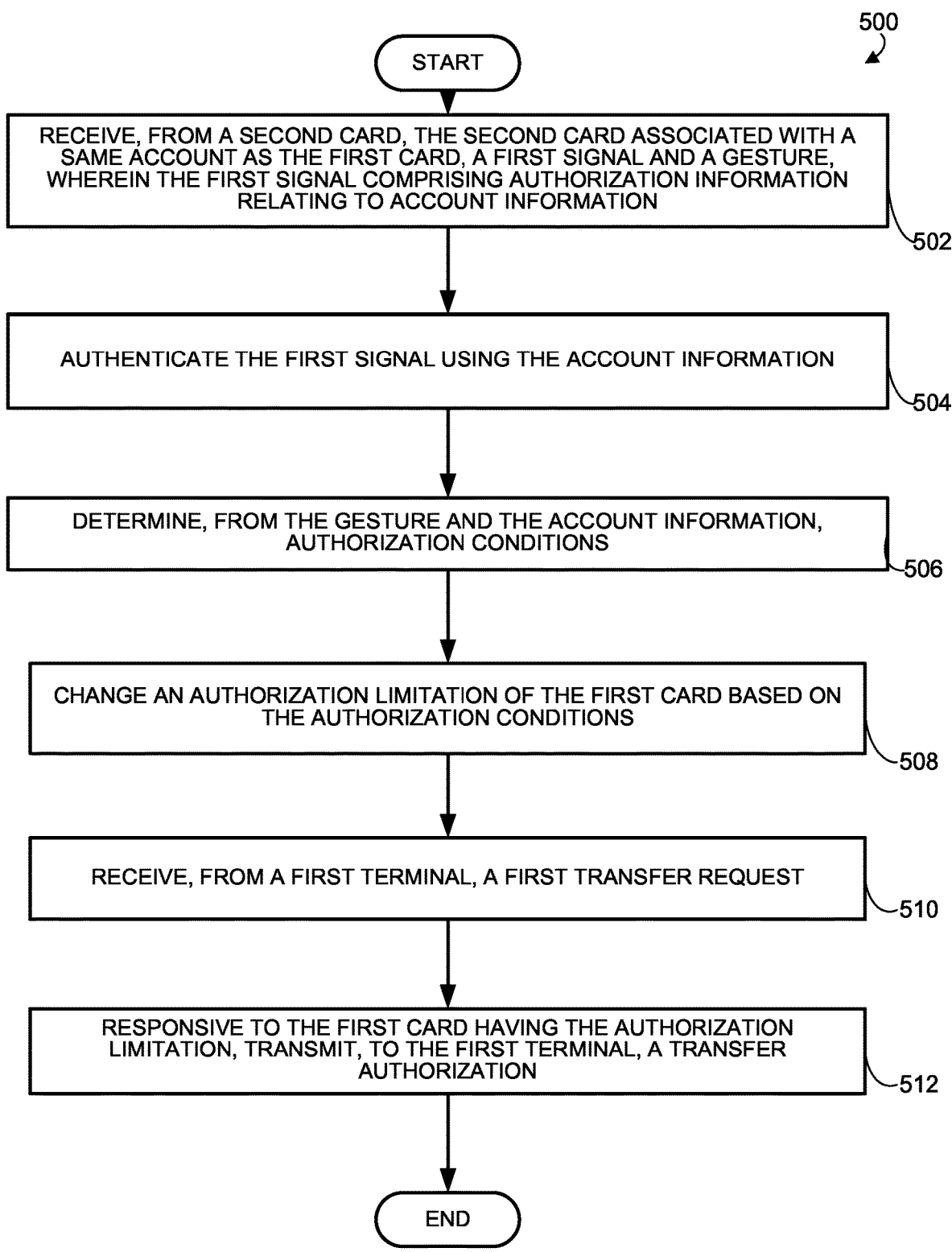
FIG. 5 is a flow diagram illustrating an exemplary method for authorizing a transfer in accordance with certain embodiments of the disclosed technology.
Figure 6:
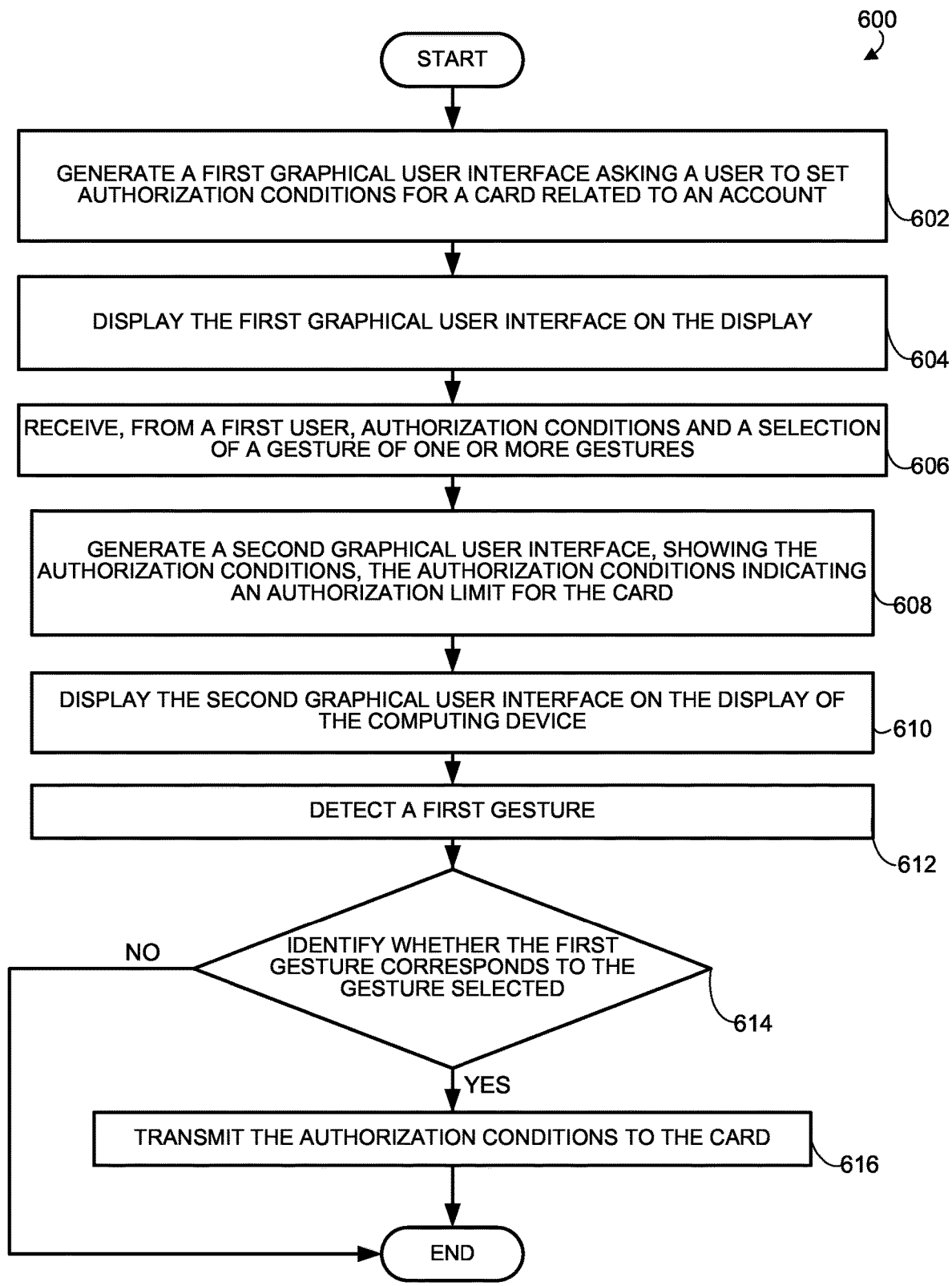
FIG. 6 is a flow diagram illustrating an exemplary method for authorizing a transfer in accordance with certain embodiments of the disclosed technology.

FIGS. 5 and 6 may generally relate to a method for allowing a first user with a first card 402 and/or first user device 402 to change the authorization limitations and/or authorization conditions of a second card 404 and/or second user device 404 of a second user connected to the same account. The users may be able to change the authorization limitations and/or authorization conditions by making specific gestures with their cards to authorize changes to the authorization conditions (e.g., the first user taps their card to the second user's card).

FIG. 5 is a flow diagram illustrating an exemplary method 500 for authorizing a transfer, in accordance with certain embodiments of the disclosed technology. The steps of method 500 may be performed by one or more components of the system 400 (e.g., authorization system 320 or web server 410 of transaction approval system 408 or user device 402), as described in more detail with respect to FIGS. 3 and 4B. User device 402 may be a first transaction card or first card 402. Second user device 404 may be a second transaction card or second card.

In block 502, the first card may receive, from a second card, the second card associated with the same account as the first card, a first signal and a gesture, wherein the first signal comprising authorization information relating to account information. The first card and/or second card may contain hardware capable of running software containing authorization system 320.

The first card 402 and the second card 404 may be associated with a shared account. For example, the account may be shared between a husband and a wife. The first card 402 may be the husband's, and the second card 404 may be the wife's. Alternatively, the first card 402 may be a child's and the second card 404 may be a mother's. Furthermore, in a business context, the first card 402 may be an employee's and the second card 404 may be a supervisor's. The first card 402 may be associated with a regular user and the second card 404 may be associated with an administrator-level user. Alternatively, the first card 402 and the second card 404 may be associated with users of equal levels.

The account may contain an interactive graphical user interface that can be accessed by mobile device (e.g., as part of a mobile application) to view and change the gestures associated with card and user device authorization. The interactive graphical user interface may be displayed on the display of the mobile device and may contain many options to select, including: different gesture actions (e.g., tap, swipe), orientations as detected by gyrometer (e.g., perpendicular, parallel), limit or merchant changes (e.g., dollar amount increases or decreases, merchant type allowed or disallowed, length of time the card could be used, a total spend limit for certain categories (e.g., gas groceries, electronics), or a time of day range the card could be used, a transaction count, a frequency of use (e.g., two times per week), or a dollar limit per time period (e.g., $100 per week)), and one or two way authorization. A gesture may include configuration options regarding an authorization for online or in-person usage (e.g., the card may be limited to in-person transactions only, online transactions only, or both). The mobile device may receive the settings of the user via the graphical user interface. The account settings may be saved on a server or be uploaded and saved on the individual cards.

As determined by referencing the account settings (e.g., as part of authorization system 320), certain transactions using one of the cards (e.g., the second user card 404 or vice versa) may require authorization from the other card (e.g., the primary user card 402). This authorization may come from the gesture of the second card relative to the first card, such as a tap or a swipe. This gesture may indicate that the second user is giving permission to the first user to purchase the item. The gesture action may have a variety of different meanings. For example, without a first card tap, the second card may have a limit of $2,000, but if the first card is tapped to the second card, then the limit of the second card is $5,000 for a certain time period (e.g., one day or one month). Alternatively, the first card tap may be used to approve the next purchase made on the second card (e.g., if the purchase was outside normal spending restrictions, such as price limits, where the user can't spend over a certain amount, or merchant limits, where the user can't make purchases at a certain merchant). For example, if the second user wanted to buy a new TV for the big game, but was prevented from making purchases at electronics stores, he could hold out his card to his spouse, who could then tap her card to his, which would then approve his next purchase at an electronics store.

When the second user makes the gesture action with the second card, the second card sends the first signal to the first card. The first card receives this first signal. The first card may detect the gesture that is being made with the second card relative to the first card. Alternatively, the second card may detect the gesture and send the gesture information to the first card. The first signal may contain account information. The account information transmitted in the first signal may be a cryptogram or may be encrypted. The account information may be in a near field communication (NFC) data format. The account information may be in a Europay Mastercard Visa (EMV) contactless format. The gesture information may also be encrypted.

In some embodiments, tapping the card to another card or a user device need not require the cards to physically touch. The cards may only need to be close enough to form a requisite NFC connection.

In block 504, the first card 402 may authenticate the first signal using the account information. This may include verifying the account information transmitted from the second card 404 with internal account information stored on the first card. This may ensure that the information transmitted to the first card 402 from the second card 404 is authentic and secure. Accordingly, the first card 402 may decrypt the cryptogram to reveal the account information.

In block 506, the first card 402 may determine, from the gesture and the account information, authorization conditions. The first card 402 may determine, utilizing software, such as authorization system 320, running on the processor and memory of the card, the specific authorization conditions that the gesture authorizes when supplied with the gesture information and the account information. The account information may contain values indicating the authorization condition in response to a known gesture (e.g., a tap from the other user's card equals a limit increase of $5000). The gesture information as received in block 502 may be compared to the known gesture value in the received or saved account information (e.g., verifying that the received gesture data matches the known gesture value).

The meaning of gestures may be assigned to the cards using a mobile application or web client connected to the account. Variations of gestures may include various different embodiments where multiple taps increase the spending dollar amount (e.g., each tap increases a spend limit by $100, a swipe increases a spend limit by $500). Authorization may also be either one-way or two-way. One-way authorization may be where one user 'approves' the card limit of another user by tapping (e.g., similar to the TV example above). Two-way authorization may be where both users 'approve' each other's limits (e.g., both cards are at a lower $5,000 limit until tapped, and then once tapped, the limit on both cards increases to $10,000). Gestures may also be orientation-sensitive (e.g., a tap with cards perpendicular to one another means something different than a tap with cards parallel to one another; for example, perpendicular to add to limit, parallel to subtract from limit). Alternatively, the one gesture could be used to change the limit and another gesture could be used to change the amount of time that limit is available for (e.g., tap to increase limit $500, swipe to hold that increased limit for 2 hours). Furthermore, gestures may also be guided by which card is on top (e.g., a secondary card below the primary card could indicate the secondary card is receiving a higher limit increase, where a secondary card may the primary card could indicate the secondary card is getting the higher limit increase taken away). Gestures may also be guided by which side of the card is being tapped (e.g., side with name is an increase, side with magnetic stripe is a decrease).

Accordingly, the account information detailing the meaning of the gestures may be uploaded to the card wirelessly. The first card may receive the account information during the gesture action. The account information may be part of the authorization information. The first card may receive the account information from the second card or directly from an associated user device that is also associated with the user account associated with the card.

In block 508, the first card 402 may change an authorization limitation of the first card based on the authorization conditions. Once the first card determines the authorization conditions, the first card may change the authorization limitation based on the authorization conditions. This may be general or specific. General authorization limitations may apply to the first card as a whole (e.g., the card spending limit when applied to all merchants). Specific authorization limitations may apply to the first card at specific merchants or for single purchases (e.g., just for purchases at Best Buy®, just for the next purchase on the card, just for purchases for the next 15 minutes). Specific authorization limitations may allow the first card to make purchases at merchants that the first card would otherwise not be allowed to make purchases at (e.g., if the first card was typically blocked from making alcohol purchases, at liquor store, but after tap was allowed to make purchases under $100). Specific authorization limitations may be related to a specific item or vendor. After completing this block, the first card may be able to make purchases requiring the changed authorization limitation.

In some embodiments, the first card 402 may communicate the changed authorization limitation to an associated mobile device of the first user. Examples of changed authorization limitations include an increase or decrease in the spending limit, an increase or decrease in available card usage time for authorizing the transfer. The associated mobile device or the first card 402 may transmit the changed authorization of the first card to an account server. The account server may store the changed authorization limitation of the first card in order to authorize the increased transaction limit of the first card.

In block 510, the first card may receive, from a first terminal, a first transfer request. The first transfer request may be a transaction request. The transaction request may be in response to the user attempting to make a purchase at a merchant. The transaction request may be encrypted and may conform to payment transaction standards, such as EMV.

In block 512, in response to the first card having the necessary authorization limitation, transmit, to the first terminal, a transfer authorization. The transfer authorization may be a transaction authorization. The first card may compare the transfer request to the authorization limitation. The first card may determine if the transfer request is within the boundaries set by the current authorization limitations (as approved by the gestures of the other cardholder). For example, if the transfer request is for a charge at a luxury leather shop for $4,700, and the authorization limitation at luxury leather shops is nothing, then the first card denies the transaction and does not send the transfer authorization. However, if the transfer request is for a charge at an automotive repair shop for $1,200, and the authorization limitation for automotive repair shops is sufficient (e.g., $5,000), then the first card accepts the transaction and transmit, to the first terminal, a transfer authorization.

In another embodiment, instead of the first card transmitting a transfer authorization, the first card may transmit its authorization limitations to the first terminal. The first terminal may transmit the authorization limitations of the first card and transaction details (e.g., a transfer request) to a payment processing server. The payment processing server may then make a determination if the transaction can be processed by comparing the transaction details to the authorization limitations.

FIG. 6 is a flow diagram illustrating an exemplary method 600 for authorizing a transfer, in accordance with certain embodiments of the disclosed technology. The steps of method 600 may be performed by one or more components of the system 400 (e.g., authorization system 320 or web server 410 of transaction approval system 408 or user device 402), as described in more detail with respect to FIGS. 3 and 4B.

Method 600 of FIG. 6 is complementary to method 500 of FIG. 5. Method 600 describes the process for utilizing an associated mobile device to assign authorization conditions and gestures to a card to change the authorization limitation. This allows the user to use the mobile device associated with the account to change authorization system 320 to meet their individual needs.

In block 602, the authorization system 320 may generate a first graphical user interface asking a user to set authorization conditions for a card related to an account. The first graphical user interface may show many options to select, including: different gesture actions (e.g., tap, swipe), orientations as detected by gyrometer (e.g., perpendicular to card, parallel to card), position (e.g., tap from top of card, bottom of card, side of card), limit or merchant changes (e.g., dollar amount increases, decreases, merchant type allowed and disallowed), and one- or two-way authorization. The account settings may be saved on a server or be uploaded and saved on the individual cards. The graphical user interface may also receive inputs from the first user including an option to allow the first user to reset a standard card spending limit for a particular card.

In block 604, the authorization system 320 may transmit the first graphical user interface for display on the computing device. Alternatively, the authorization system 320, if operating on the computing device containing the display, such as user device 402, may display the first graphical user interface on the display of the user device 402. The graphical user interface may be interactive and may be configured such that the user may be able to change and alter the interface in real-time. The user may be able to interact with the interface using a number of different interface devices, such as touch, or pointing devices, such as a mouse.

In block 606, the authorization system 320 may receive, from a first user, authorization conditions and a selection of a gesture from one or more gestures. As described with reference to block 506, the first user may provide the authorization conditions and the selection of the gesture using the interactive graphical user interface presented in block 602 and 604. The graphical user interface may present one or more gestures that the user can choose from (e.g., a single tap, a double tap). Using the graphical user interface, the user may be able to build attributes of gestures together using the graphical user interface (e.g., a perpendicular single tap means something different from a parallel single tap). The first user may be able to assign or associate authorization conditions with a gesture via the graphical user interface. For example, the first user, via the graphical user interface, may be able to choose that a single tap correlates to the second user receiving a global limit increase of $500. In another example, the first user, via the graphical user interface, may be able to choose that a double tap correlates to the second user receiving a limit increase of $2,000 at consumer electronic stores. This may include other features mentioned in reference to block 506. The graphical user interface may contain a number of drop-down or option menus featuring authorization condition options with fill-in-the-blank options for amounts. Similarly, the graphical user interface may also contain option menus showing the assortment of different gestures available to the user choose from. These may include pictures or animations and videos showing the user sample actions of the gesture. Through the graphical user interface, the user may be able to choose more than one gesture for an authorization condition and/or setup multiple different authorization conditions with multiple different authorization limitations and multiple different gestures.

In optional block 608, the authorization system 320 may generate a second graphical user interface, showing the authorization conditions, the authorization conditions indicating an authorization limitation for the card. The second graphical user interface may indicate a current state of the card given the authorization conditions. The second graphical user interface may change in real-time as the status of the card changes. The second graphical user interface may show an authorization limitation for the card based on the authorization conditions (e.g., if the authorization conditions allowed the card, once tapped to have an increased limit of $5,000, and the card had been tapped, the second graphical user may show that the card has an increased limit of $5,000 because of authorization condition X, which was granted at Y (particular time and date), by user Z, where the normal limit would be amount $A). The second graphical user interface may give the first user an option to revoke the authorization limitation or authorization conditions.

The first user may be able to access the second graphical user interface through an associated mobile application associated with an account associated with the card. This may allow the first user to access the second graphical user interface at any time after setting up the authorization conditions and gestures for the card.

In optional block 610, the authorization system 320 may transmit the second graphical user interface for display on the computing device. Alternatively, the authorization system 320, if operating on the computing device containing the display, such as user device 402, may display the second graphical user interface on the display of the user device 402. This may be similar to block 604.

In block 612, the authorization system 320 may detect a first gesture. The authorization system may detect the first gesture. The first gesture may be detected by the authorization system using the first device. The first device may contain sensors for detecting the first gesture (e.g., accelerometers, gyrometers, NFC sensors, proximity sensors). In some embodiments, LIDAR may be used to identify the proximity and orientation of the device or card to indicate gestures. In some examples, NFC signal strength may be used to tell card orientation. NFC signal strength may be determined using signal impedance. The first device may establish a connection with the second device (and/or second card) and the second card may transmit information or data to the first device relating to the gesture or containing identification information regarding the second card. For example, the first device may establish an NFC connection with the second device. The second device may measure the NFC signal impedance from the first device. If the NFC signal impedance received from the first device does not sufficiently match a known full power of a device of the type of the first device, then the second device can determine that first device is aimed in a different orientation than the second device. Furthermore, based on the impedance of the signal, the second device may be able to calculate the orientation (or angle) at which the first device is from the second device. The second device may send the NFC impedance and/or connection information to the first device through NFC or through other communication means. The first gesture may be associated with the first user, for example, tapping their first user device to a second user's card. Alternatively, the first gesture may be associated with the second user, for example, tapping their second user card to the first user device.

In block 614, the authorization system 320 may identify whether the first gesture corresponds to the gesture selected. The authorization system may use the data received about the gesture and compare that to the selected gesture associated with the authorization conditions. The system may compare the data received from the second user's card 404 to the data of the first user device (e.g., compare the accelerometer, gyrometer, and NFC data of the second user's card 404 to the accelerometer, gyrometer, and NFC data of the first user device). The first user device 402 may use identification data from the second user's card 404 to identify the second user's card as related to the to the same account as the first user's device.

If the gesture does not correspond to any authorization conditions, the process ends. If the gesture corresponds to any authorization conditions previously setup in block 606, then the process continues to block 616.

In block 616, the authorization system 320 may, in response to identifying the first gesture corresponds with the selected gesture, transmit the authorization conditions and/or the authorization limitation to the second user's card. Once the authorization conditions and/or authorization limitation are transmitted to the second user's card 404, the card may process and authorize transactions up to the new authorization limitation for the categories of transactions specified by the authorization conditions.

In some embodiments at block 616, the authorization system 320 may transmit the authorization conditions and/or the authorization limitation to a server. The server may be the type of server used for typically authorizing card transactions. The server may be instructed by the authorization system 320 to allow purchases on the second user's card 404 according to the authorization conditions up to the authorization limitation.

After the second user's card 404 and/or server receive the authorization condition and/or authorization limitation from the first user device 402, the card may receive a first transfer request from a transaction terminal. If the transfer request is within the necessary authorization limitations and authorization conditions, the card may transmit a transfer authorization to the transaction terminal. This process may be repeated accordingly as the card receives purchase and transfer requests from transaction terminals.

After the transmission of the authorization conditions to the card, the authorization system 320 may display a graphical user interface on either the user device of the first user 402 or the second user 404 (if applicable) to indicate the new authorization conditions.

In an alternative embodiment, the user device 402 may receive instructions from the user changing the authorization conditions and/or setting up the card 403 using the graphical user interface prior to performing the gesture action with the card 403. Afterwards, the user may then perform the gesture to upload the conditions to the card 403.

Figure 7A:
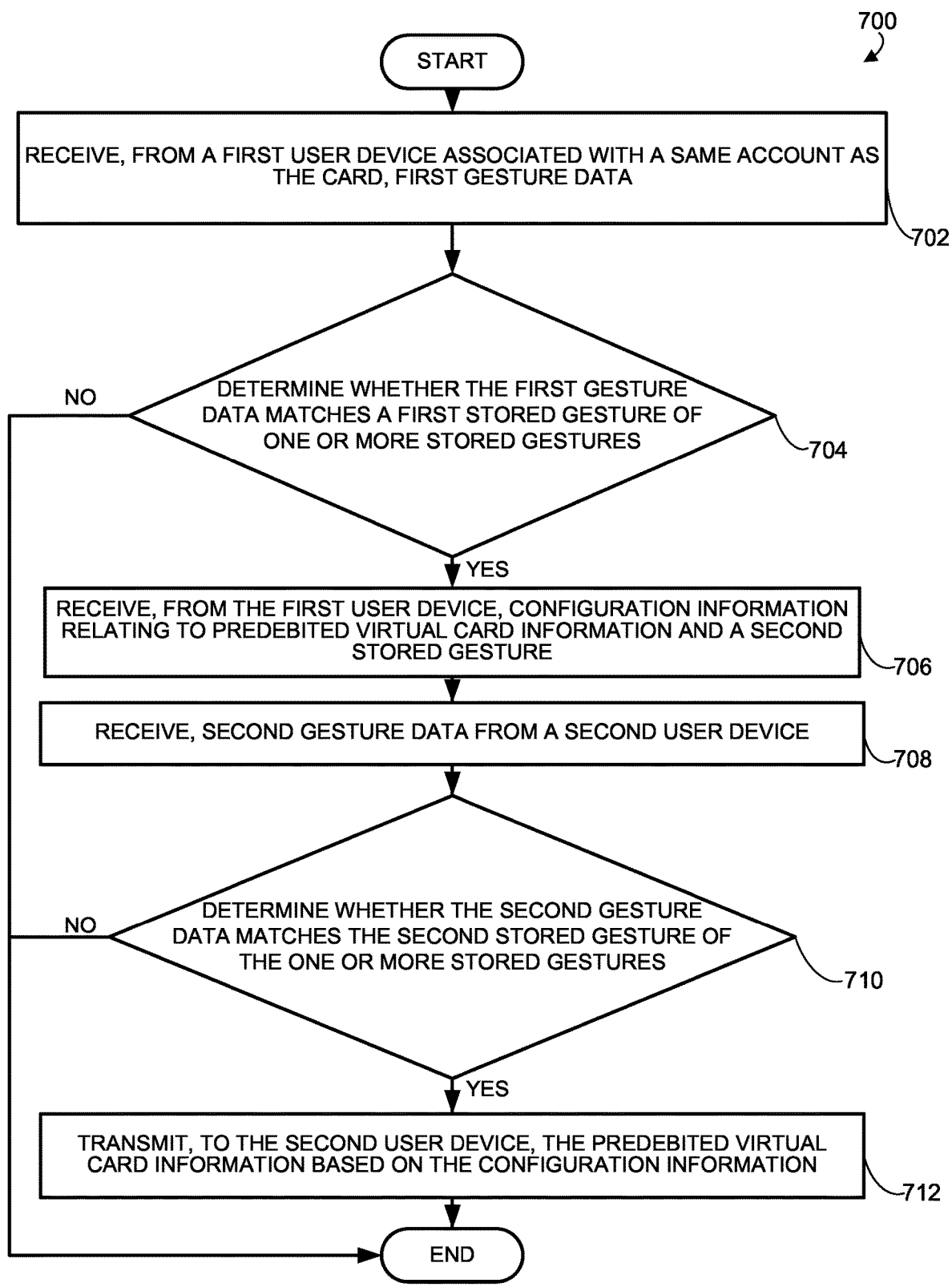
FIG. 7A is a flow diagram illustrating an exemplary method for sharing a virtual card in accordance with certain embodiments of the disclosed technology.
Figure 7B:
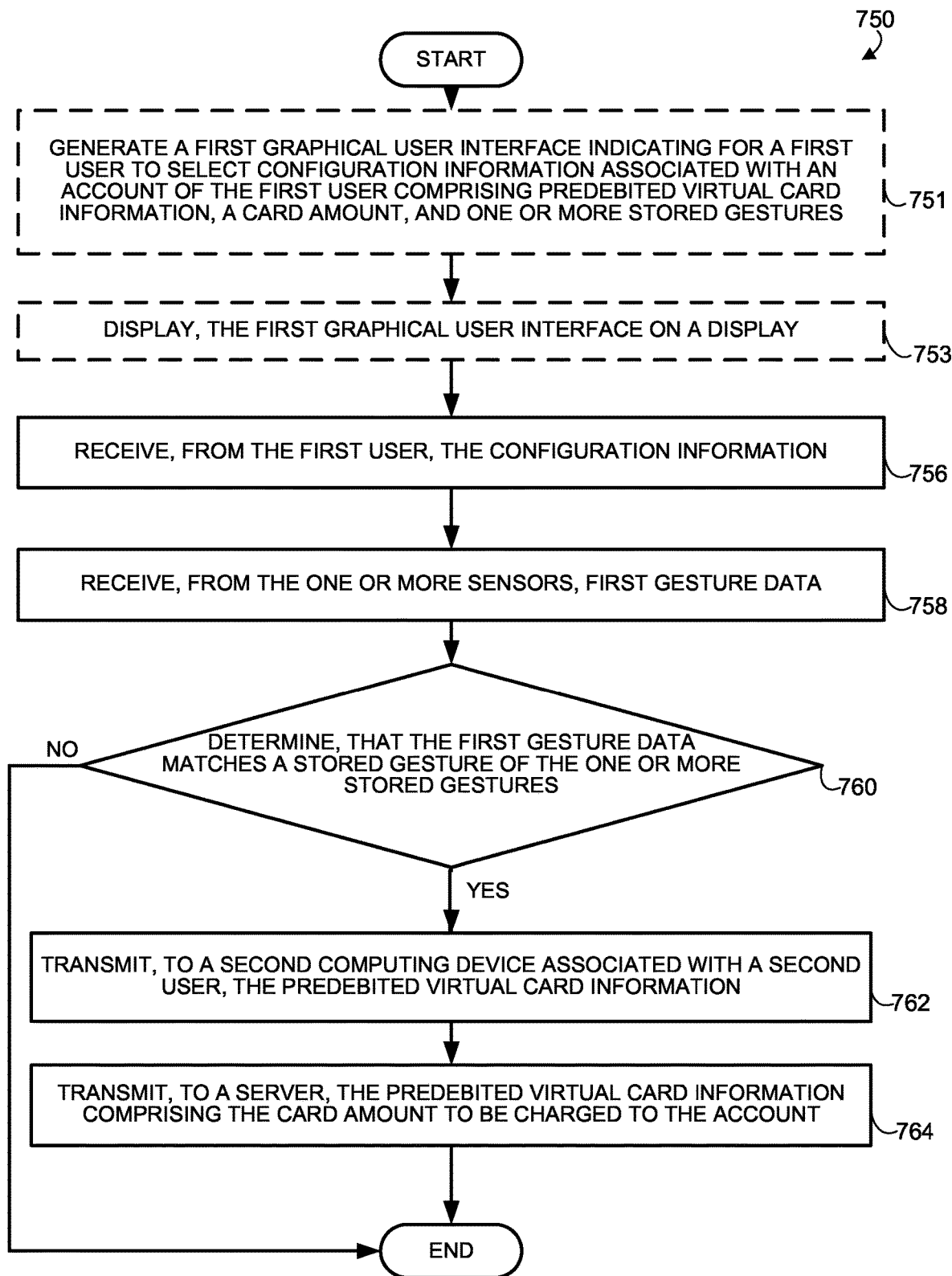
FIG. 7B is a flow diagram illustrating an exemplary method for sharing a virtual card in accordance with certain embodiments of the disclosed technology.
Figure 8:
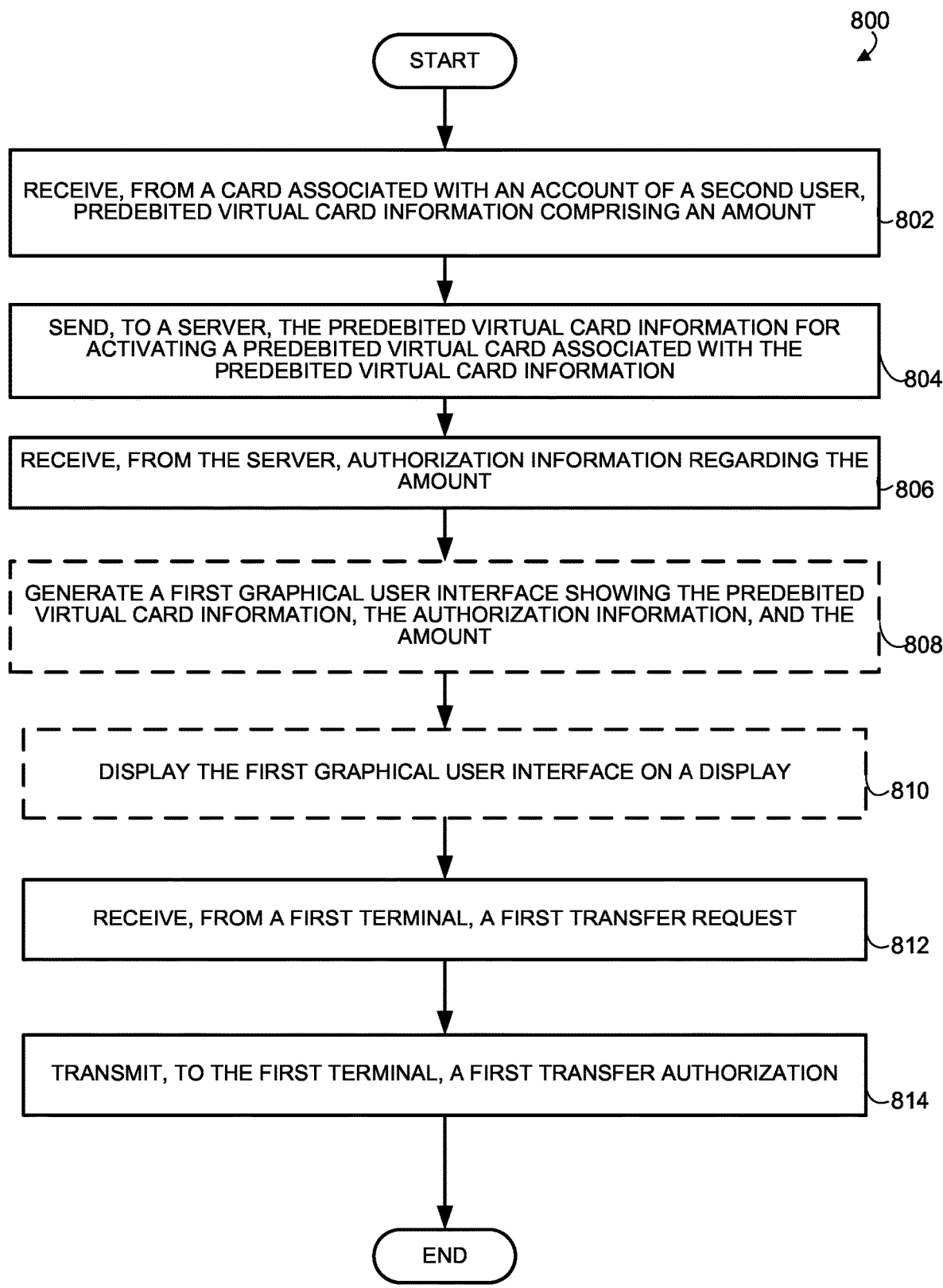
FIG. 8 is a flow diagram illustrating an exemplary method for sharing a virtual card in accordance with certain embodiments of the disclosed technology.

FIGS. 7A, 7B, and 8 generally describe a system that allows a first user to send a predebited virtual card to a second user. For example, this may be completed with the first user tapping (or making another gesture) from a card 403 to the second user's device 404 or the first user tapping (or making another gesture) a first device 402 to a second user's device 404. When this occurs, the first user's card 403 or device 402 transmits information to the second user's device 404 that can then be used as a to create a predebited virtual card. The first user's card account may be immediately debited or charged for the amount of the virtual card. This results in a safer method to give another user money rather than giving a secondary user a permanent virtual card attached to the credit or debit account of the primary user.

FIG. 7A is a flow diagram illustrating an exemplary method 700 for sharing a virtual card, in accordance with certain embodiments of the disclosed technology. The steps of method 700 may be performed by one or more components of the system 400 (e.g., authorization system 320 or web server 410 of transaction approval system 408 or user device 402), as described in more detail with respect to FIGS. 3 and 4C. FIG. 7A may describe the process steps from the perspective of the card interacting with a first user device for setup, and a second user device for authorizing a transfer authorization.

In block 702, the card 403 may receive from a first user device 402 associated with a same account as the card, the first gesture data. The first user device 402 may be used to setup the card of the first user 403. The first gesture may be a 'setup' gesture, and may be associated with the account owner/primary user of the account. The card 403 may be configured such that first gesture data is pre-embedded in the card. Therefore, for example, on first use, the card 403 can be tapped to the user's phone for a first setup. The first user device 402 may receive a signal from the user so that the user can change the gesture used for setup for subsequent uses. This may be completed using an interactive graphical user interface on a related mobile application.

In response to detecting a card 403 is nearby (or a gesture or an attempt at a gesture), the first user device may transmit, to the card, gesture data, via NFC. The gesture data may entail an assortment of data from the first user device 402, including accelerometer, gyrometer, and NFC data. The gesture data from the first user device 402 may also include a signal from the first user device indicating what the first user device believes the gesture is intended to be by the user. The first user device 402 may also send device information about the user device to the card, such as the username or account data of the primary user for a related installed mobile application, manufacturer, or model number. The first user device 402 may also power the card through via coils complying with NFC specifications.

In block 704, the card 403 may determine whether first gesture data matches a first stored gesture of one or more stored gestures. Once the card 403 receives the first gesture data, the card determines whether the received first gesture data matches a first stored gesture. The first stored gesture may be a tap. The card 403 may compare the first gesture data with the first stored gesture and one or more stored gestures from an inventory or database of possible gestures. The card 403 may be required to determine that the first gesture data matches the first stored gesture above a certain confidence threshold. This may be accomplished by using models that embed stored gesture data, including vectors of distance, speed, acceleration, direction, or angle, into the embedding space of the card 403. The card 403 may be capable of comparing the vectors of the stored gesture data to the vectors of the first gesture data for similar characteristics, such as distance, speed, direction, acceleration, or angle. If the vectors of the first gesture data are above a confidence threshold of similarity to the vectors of the stored gesture data, then the card 403 may determine that the gesture has been performed. The card 403 may also use the user device information, username, or other account data to help match the gesture data to the appropriate stored gesture. Parts or all of the information received from the first user device may be encrypted.

Once the authorization system 320 has determined that first gesture data matches the first stored gesture (and therefore, that the primary user has performed the gesture with his/her card near his/her phone), the card 403 may enter a modifiable state, where it is open to receive configuration changes regarding the virtual card information and the stored gestures.

In block 706, the card 403 may receive, from the first user device 402, configuration information relating to predebited virtual card information and a second stored gesture. The second gesture may be a gesture associated with a second user's device 404 when the primary user would like to make a gift or payment to the second user. The second gesture may be the same or different from the first gesture. The first user device may transmit configuration information to the card. The configuration information may contain information related to a preconfigured predebited virtual card, such as an amount, usage limitations (e.g., ability to use the card only at certain times, only a certain number of times, or only at certain merchants), and predebited virtual card information (e.g., such as a virtual card number, expiration, or CVV code, or data in accordance with EMV format). The first user device 402 may transmit more than one preconfigured predebited virtual card number (or setup) to the card. The first user device 402 may transmit second stored gesture information to the card 403. This may comprise a gesture chosen by the user via the graphical user interface of the first user device 402 as described more thoroughly in other embodiments. The second gesture received from the user via the graphical user interface may indicate the gesture the user wants to use to transfer an amount of money via the predebited virtual card. The user may setup multiple different gestures with multiple different predebited preset virtual card configurations using the graphical user interface. The configuration information and the second stored gesture may be transferred to the card 403 in an encrypted format.

After receiving the new configuration information, the card 403 may decrypt the configuration information and second stored gesture. The second stored gesture may be a tap. The card 403 may apply and save the new configuration information and second stored gesture. The card 403 may then revert to an unmodifiable state, where the configuration information cannot be changed, but the card can be used to make transfers and purchases.

In some embodiments, the card 403 may be configured with a default gesture and the primary user may be able to tap the card to the secondary user's device 404 without preconfiguring the card.

In block 708, the card 403 may receive second gesture data from a second user device 404. This process may be largely similar to block 702, with the second user device 404 sending the card 403 data regarding the interaction. For example, the primary user may want to give the secondary user a $100 virtual card, therefore, the primary user may tap their card 403 to the secondary user's phone. The second user device 403 may interact with the card using a different mobile application or a different part of the same mobile application used by the primary user. The mobile application may allow the second user device 403 to interact with the card. If the second user does not have the mobile application installed on their mobile device, making a gesture with the card 403 near the mobile device may prompt the second user to install the mobile application on their mobile device.

In block 710, the card 403 may determine whether the second gesture data matches the second stored gesture of the one or more stored gestures. This process may be largely similar to block 704 and is not repeated herein for brevity.

In block 712, the card 403 may transmit, to the second user device 404, the predebited virtual card information based on the configuration information. Once the card 403 has determined that the second gesture data matches the second stored gesture, the card 403 uses the configuration information to send the appropriate predebited virtual card information to the second user device 404. This may include a virtual card number, expiration, or CVV code, or data in accordance with EMV formatting. The data transmitted to the second user device 404 may be encrypted. The information sent to the second user device 404 may also contain limitations on the use of the predebited virtual card (e.g., limits on which merchants the card could be used at, how long the virtual card can be used for, a transaction number limit, a total dollar amount, a total spend limit for certain categories (e.g., gas groceries, electronics), or a time of day the card could be used).

Once the second user device 404 has the predebited virtual card information, the mobile application on the second user device may decrypt the predebited virtual card information (and any other limitation information provided by the card). The second user device 404 may transmit the charge to a processor of the amount of the predebited virtual card against the primary account of the card 403. Alternatively, the card 403 may charge or debit the amount of the predebited virtual card against the primary account of the card 403. This allows the charge of the predebited virtual card to post quickly.

The second user device 404 may provide a graphical user interface showing the second user the predebited virtual card. The graphical user interface may show the second user any limitations on the card (such as a time limit, merchant restrictions, or amount limit).

FIG. 7B is a flow diagram illustrating an exemplary method 750 for sharing a virtual card, in accordance with certain embodiments of the disclosed technology. The steps of method 750 may be performed by one or more components of the system 400 (e.g., authorization system 320 or web server 410 of transaction approval system 408 or user device 402), as described in more detail with respect to FIGS. 3 and 4C.

Method 750 of FIG. 7B is complementary to method 700 of FIG. 7A. FIG. 7A describes an embodiment of the system where a card is used to make the gesture and is used to transfer the predebited virtual card information, whereas FIG. 7B describes an embodiment of the system where the primary user device is used to make the gesture and transfer the predebited virtual card information to a second user device.

In optional block 751, the authorization system 320 may generate a first graphical user interface indicating for a first user to select configuration information associated with an account of the first user comprising predebited virtual card information, a virtual card amount, and one or more stored gestures. The authorization system 320, may, via a mobile application on the primary user device 402, generate a graphical user interface prompting the user to select configuration information for the predebited virtual card. The graphical user interface may provide a larger number of options for the user to choose from and include presets and preconfigured options. The graphical user interface may include options to associate a gesture with a predebited virtual card number and a certain card amount, and certain spending limitations (e.g., time limitations or merchant limitations). The graphical user interface may include options to select several different gestures associated with several different preselections (e.g., a tapping gesture creates a predebited virtual card for $500, but a sliding gesture creates a predebited virtual card for $1000). The graphical user interface may include options to assign meaning to other features of gestures, like counts (e.g., one tap is a virtual card for $100, two taps is a virtual card for $200), or orientation (e.g., a tap with two devices in parallel is a virtual card for $300, a perpendicular tap is $600). A gesture may include configuration options regarding an authorization for online or in-person usage of the virtual card (e.g., the card may be limited to in-person transactions only, online transactions only, or both).

In optional block 753, the authorization system 320 may display the first graphical user interface on a display. The first user device 402 may be configured to display the graphical user interface on the mobile application of the primary user device.

In block 756, the authorization system 320 may receive, from the first user, the configuration information. The primary user device 402 may receive the configuration information via the interactive graphical user interface through the mobile application. The configuration information may include the features referred to in optional block 751, which are not repeated herein for brevity. Once the user completes the process to setup the configuration information and the gesture, the first mobile device may be used to distribute predebited virtual cards when the user makes the associated first gesture with the mobile device near the second computing device 404 of the recipient of the predebited virtual card.

In block 758, the authorization system 320 may receive, from the one or more sensors, first gesture data. The sensors may include accelerometers, gyrometers, and GPS and other positioning data. The first gesture data may also include NFC data and data received from the second user device. NFC signals may be used to determine the type of gesture or orientation using impedance, as described in reference to block 612. The data from the second user device 404 may include sensor data from accelerometers, gyrometers, GPS, cellular data, WiFi™, and other positioning data, and NFC signal data from the second user device 404. The primary user device 402 may receive the data from the second user device via NFC during the gesture action. Alternatively, the primary user device 402 may receive data from the second user device 404 after the gesture action via other communication methods such as via WiFi™, Bluetooth™, or through cellular data networks.

In block 760, the authorization system 320 may determine that the first gesture data matches a stored gesture of the one or more stored gestures. Once the first user device 402 has received the data related to the first gesture, the authorization system 320 may determine if the first gesture matches a stored gesture related to a predebited virtual card indicating that the user intended to transfer a predebited virtual card to the second user's device. This process is similar to the process outlined in block 710 and/or block 704 and is not repeated herein for brevity.

In block 762, the authorization system 320 may transmit, via the first user device 402, to a second computing device 404 associated with a second user, the predebited virtual card information. This process is similar to the process outlined in block 712 and is not repeated herein for brevity.

In block 764, the authorization system 320 may transmit, to a server, the predebited virtual card information comprising the card amount to be charged to the account. Once the predebited virtual card information is transferred to the second user device 404, the primary user device 402 may transmit details regarding the predebited virtual card to a payment processing server. This may allow the payment processor to make a charge against the account of the first user for the amount of the predebited virtual card. This may immediately show as a pending charge as soon as the predebited virtual card information is transferred to the second user's device 404.

As a result of the predebited virtual card being activated by the payment processing server, or as a result of charge being processed against the first user account, the first user device 402 may receive a message that the predebited virtual card is activated and/or that the card amount has been debited from the account. The authorization system 320 may generate a graphical user interface for displaying a message that predebited virtual card is activated and that the first user's account has been charged for the amount of the predebited virtual card. The first user device 402 may also show alerts via the graphical user interface regarding the predebited virtual card. For example, if the second user makes a charge on the predebited virtual card, the first user may receive an alert via the graphical user interface on the first user device that the second user has made a charge on the predebited virtual card. The first user may be able to interact with the graphical user interface to see details of the charge (e.g., the graphical user interface may receive inputs from the user and change the display to show the user more details regarding the charge, like the merchant, location, amount, or time). The graphical user interface may also disclose a current balance of the predebited virtual card by subtracting charges made by the second user from the limit of the card. The graphical user interface may show the current balance. The graphical user interface may also allow the first user to see the card amount, transaction limit, or card time limit and alter or change these attributes or configuration information in real time. For example, the first user may want to increase or decrease the predebited virtual card amount. The altered configuration information may be displayed on graphical user interface on the first user device in real time.

Changing some of the attributes or configuration information of the predebited virtual card may require cancelling and redistributing the predebited virtual card remotely. This may be completed using the activation server. For example, the authorization system 320 may receive a request that the first user wants to deactivate the predebited virtual card. The authorization system 320 may transmit information to the activation server to deactivate the predebited virtual card. The first user device 402 may then receive a signal from the server that the predebited virtual card is deactivated and display a graphical user interface indicating to the first user that the predebited virtual card has been deactivated.

An interactive graphical user interface may also be presented on the second user device 404 and disclose the same or similar information to the second user. The second user may be able to view, but not modify the attributes or configuration information of the predebited virtual card. The second user may be capable of requesting changes to the attributes or configuration information through the graphical user interface, which can then be approved by the primary user.

FIG. 8 is a flow diagram illustrating an exemplary method 800 for sharing a virtual card, in accordance with certain embodiments of the disclosed technology. The steps of method 800 may be performed by one or more components of the system 400 (e.g., authorization system 320 or web server 410 of transaction approval system 408 or user device 402), as described in more detail with respect to FIGS. 3 and 4C.

Method 800 of FIG. 8 is complementary to method 700 of FIG. 7A. FIG. 7A describes an embodiment of the system from a card perspective, whereas FIG. 7B describes an embodiment of the system from a second user device perspective. The second user device receives prefunded virtual card data from the card after a gesture (presumably as the primary user makes a gesture with the card toward the second user's device).

In block 802, the authorization system 320 may receive, from a card 403 associated with an account of the main user, predebited virtual card information comprising an amount. During or shortly following a gesture, the second user device 404 may receive predebited virtual card information from the card 403 or the primary user device 402, depending on the embodiment. The predebited virtual card information may include the predebited virtual card number, expiration date, CVV code, and any limitations. The predebited virtual card information may be encrypted and may have to be decrypted by the second user device 404. The predebited virtual card information may be in a Europay-Mastercard-Visa (EMV) data format. The predebited virtual card information may be a EMV token or employ EMV tokenization methods.

In block 804, the authorization system 320 may send, to a server, the predebited virtual card information for activating a predebited virtual card associated with the predebited virtual card information. The second user device 404 may be required to activate the predebited virtual card using by contacting a card activation server or other server using an internet connection. The connection may be made via Bluetooth™, WiFi™, cellular data, or other common connection methods. The second user device 404 may transmit the virtual card number, expiration date, CVV code, and/or any limitations to the card activation server. The second user device 404 may transmit an EMV token to the card activation server.

In block 806, the authorization system 320 may receive, from the server, authorization information regarding the amount. The second user device 404 may, in some embodiments, receive further authorization information from the card activation server. Further authorization information may include, for example, an amount limit, merchant limits, or time limit. The limitations may be the same as or different from the limits provided by the second user device 404 to the server. The amount may be an available amount.

In some embodiments, the primary user may be able to actively change the limitations of the predebited virtual card using the graphical user interface on the primary user device 402. The primary user device 402 may receive the revised limitations from the graphical user interface and transmit the revised limitations to the activation server. The activation server may transmit the revised limitations to the second user device.

In block 808, the authorization system 320 may generate a graphical user interface showing the predebited virtual card information, the authorization information, and the amount. The second user device 404 may create an interactive graphical user interface as part of a mobile application displaying the predebited virtual card information, the authorization information, and the amount of the predebited virtual card. A second graphical user interface may show the image or 3D representation of a card on the screen with the appropriate card number, expiration date, and CVV in typical locations (e.g., like a physical card) that the user may be able to interact with (e.g., flip over) using the input mechanism of the second user device 404 (these may also be present on the primary user device 402). The graphical user interface may also show a ledger showing the original balance of the predebited virtual card, current charges on the virtual card, and a current balance of the virtual card. The ledger may be updated in real-time on the graphical user interface as the user makes purchases with the virtual card. The user may be able to select purchases via the graphical user interface and see more details about the purchase (e.g., location of the retailer, amount of the transaction, the name of the retailer, the category of the retailer, or the relative location of where authorization was given on an interactive map).

In block 810, the authorization system 320 may display the graphical user interface on a display. This block may be largely similar to block 753 but pertain to the display on the second user display and is not repeated herein for brevity.

In block 812, the authorization system 320 may receive, from a first terminal, a first transfer request. The first transfer request may be a transaction request. The transaction request may be in response to the user attempting to make a purchase at a merchant. The transaction request may be encrypted and may conform to payment transaction standards, such as EMV.

In block 814, the authorization system 320 may transmit, to the first terminal, a first transfer authorization. In response to receiving the transfer request, the second user device 404 may transmit a transfer authorization to the first terminal. The transfer authorization may contain the predebited virtual card number, expiration date, and/or CVV code. Alternatively, the transfer authorization may be completed using EMV tokenization. The transfer authorization, in some embodiments, may be transmitted only if the transfer request meets the limitations, such as the amount, as given in by the card in block 802 or the authorization server in block 806. In other embodiments, the transfer authorization may be transferred regardless if the if the transfer request meets the limitations, and transaction server may confirm or deny the transaction based on if the transfer request meets the limitations.

In some embodiments, the first user device 402 may contain an application with a graphical user interface that displays an indication when the first transfer authorization is transmitted. Similarly, the second user device 404 may contain an application with a graphical user interface that displays an indication when the first transfer authorization is transmitted.

In some embodiments, the second user device 404 may receive gesture data from the first user device 402 or the first user's card 403. Instead of the card 403 or first user device 402 determining if the gesture data matches the stored gestures, the determination may be completed using the second user device 403. In response to determining that the gesture matches the stored gestures, the second user device 403 may generate and display a graphical user interface showing updated predebited virtual card information, authorization information, and the predebited virtual card amount. This may also be used to deactivate the predebited virtual card by transmitting a message to the activation server.

Example Use Case

The following example use case describes several example user flow patterns. This section is intended solely for explanatory purposes and not in limitation.

In a first example, Brad receives a new secure credit card 404 and a has cell phone 402 with a banking mobile application and account. Brad receives a card activation code (block 102) from a banking server for his new secure credit card 404 on his mobile application. The mobile application prompts Brad to enter locking conditions for his new card. Brad decides to use the default locking conditions (e.g., that the card will default to locked and once unlocked will remain unlocked for a single use). Brad is prompted by the instructions on his cell phone to tap the credit card to his cell phone (block 104). Brad taps the credit card to the cell phone and the cell phone displays a message that the card is activated and the locking conditions have been uploaded to the card (blocks 106, 108).

Brad then decides to go shopping and use the card. Brad uses the mobile application graphical user interface to select an option to unlock the card (block 110). The mobile application prompts Brad to tap the card to his cell phone to unlock it. Brad taps the card to the phone (block 112). The phone displays a message indicating that the card is now unlocked and can be used (block 116). The phone also vibrates to indicate the card is unlocked. The card 404, at the point of being tapped to the cell phone, has connected with the cell phone (block 209), received the unlock authorization (block 213), verified the unlock authorization's contents, and changed from a locked state to an unlocked state (block 214). Brad then taps the card on a payment terminal to make a payment. The card receives a first payment request (block 220) from the payment terminal. The card transmits a payment authorization to the payment terminal (block 222) and then returns to the default locked state according to the locking conditions used by Brad in block 104 (block 224).

In a second example, Charlie has a credit card account that he shares with his teenage daughter, Anna. Anna has a credit card and is an authorized user on Charlie's account with a typical card limit of $100. Charlie uses his cell phone with a mobile application to manage his credit card account. The mobile application has a graphical user interface that asks Charlie to set authorization conditions, an authorization limitation, and a gesture for Anna's card (blocks 602, 604). Charlie chooses via the graphical user interface on the mobile application that he wants to be able to increase the limit on Anna's card to $500 for all categories of merchants in response to single tap gesture in any orientation (block 606). The mobile application generates a new graphical user interface in response to receiving Charlie's instructions and shows that Anna's current limit is $100, but the limit could be increased to $500 in all categories if a single tap is completed (blocks 608, 610).

Later, Charlie taps his phone to Anna's credit card. Charlie's phone detects that a gesture has been attempted and records the appropriate telemetry (via a gyrometer, accelerometer, and NFC data) (block 612). Anna's credit card sends telemetry and identity information to Charlie's phone via near field communication (NFC). Charlie's phone uses the identity information to confirm that Anna's card is part of the same credit card account. Charlie's phone also compares the telemetry from Anna's credit card to the telemetry from Charlie's phone. Charlie's phone compares determines that the gesture performed corresponded to the single tap in any orientation chosen by Charlie earlier (block 614). Therefore, Charlie's phone transmits the new authorization conditions and authorization limitations to Anna's card via NFC (block 616). Anna's card can now be used for purchases up to $500 at any merchant, as assigned by Charlie earlier.

In a third example, David, a small business owner, wants to give some money to his employee Sarah to purchase office supplies. David's card is configured for such that he can tap it perpendicularly to his smartphone to configure it. David taps his card to his smartphone in a perpendicular orientation. The card receives, from the smartphone, gesture data (NFC signal strength data and gyrometer data) regarding the tap in the perpendicular orientation (block 702). The card then determines by comparing with its own NFC signal data and gyrometer data that the gesture, the tap the perpendicular orientation, matches the stored gesture for the card to enter a modifiable state (block 704). The card enters a modifiable state. David then uses the touchscreen display on his smartphone using the related mobile application to modify the configuration relating to the predebited virtual card information and a related second stored gesture. David sets that the predebited virtual card should have a value of $500 and is restricted to being used at only at office supply stores and expires in 7 days. David sets that the gesture for giving the predebited virtual card to another is a tap in the vertical orientation to the receiver's device. The configuration information for the predebited virtual card and the second stored gesture are uploaded to the card (block 706).

Later, David sees Sarah and wants to give her the predebited virtual card. David takes out his card and taps Sarah's smartphone such that the long side of the card is parallel with the long side of Sarah's smartphone. The card receives, from Sarah's smartphone, gesture data (NFC signal strength data and gyrometer data) regarding the tap in the parallel orientation (block 708). The card then determines by comparing with its own NFC signal data and gyrometer data that the gesture, the tap the parallel orientation, matches the stored gesture for the card to transfer the predebited virtual card information to Sarah's smartphone (block 710). The card then transmits the predebited virtual card information, based on the configuration information to Sarah's smartphone (block 712). A mobile application on Sarah's smartphone then presents a graphical user interface indicating that Sarah now has a virtual card for $500 that expires in 7 days and can only be used at office supply stores and shows Sarah the virtual card number, expiration date, and CVV code of the card. The mobile application on Sarah's smartphone also contacts a transaction server to charge David's account for $500. David smartphone presents him with an interactive graphical user interface notification that notifies him that his credit card account has been charged for an amount of $500. The graphical user interface also has options to view the charges on the predebited virtual card and revoke the predebited virtual card.

Two days later, Sarah goes to the office supply store and spends $150 using the prefunded virtual card from her smartphone. The mobile application shows her in real-time her spending habits. David also gets a notification of an office supply store charge on Sarah's prefunded virtual card for $150. Sarah uses the card several other times. At the end of the 7 days, the prefunded virtual card expires with $200 left on the balance. The prefunded virtual card balance is refunded to David's credit card account. The prefunded virtual card information is deleted from Sarah's smartphone.

In some examples, disclosed systems or methods may involve one or more of the following clauses:

Clause 1: A computing device comprising: one or more processors; memory in communication with the one or more processors and storing instructions that are configured to cause the computing device to: receive a card activation code; initialize and pair, using the card activation code, a card with the computing device, wherein the card is in a default locked state and unable to conduct transactions based on one or more locking conditions; generate a graphical user interface indicating to a user that the card is activated; display the graphical user interface on a display of computing device; receive a first signal to change the card to an unlocked state; responsive to receiving the first signal: transmit, to the card, an unlock authorization to change the card from the default locked state to the unlocked state; generate an updated graphical user interface indicating to the user that the card is unlocked; and display the updated graphical user interface on the display.

Clause 2: The computing device of clause 1, wherein initializing the card does not require internet access.

Clause 3: The computing device of clause 1, wherein the card activation code is associated with a specific user account of a mobile application on the computing device.

Clause 4: The computing device of clause 1, wherein the memory stores further instructions that are configured to cause the computing device to: generate a second graphical user interface giving the user an option to change the state of the card to the default locked state; display the second graphical user interface on the display; receive a second signal to change the card to the default locked state; and transmit, to the card, a lock authorization to change the card from the unlocked state to the default locked state.

Clause 5: The computing device of clause 1, wherein a mobile application pairs a second device with the card, and the second device has permissions to change the card from the default locked state to the unlocked state and set the one or more locking conditions.

Clause 6: The computing device of clause 1, wherein the memory stores further instructions that are configured to cause the computing device to: generate a third graphical user interface for receiving a selection of an account used by the card from the user; display the third graphical user interface on the display; receive the selection of the account via the third graphical user interface; and transmit the selection of the account to the card.

Clause 7: The computing device of clause 1, wherein the memory stores further instructions that are configured to cause the computing device to: generate a fourth graphical user interface for changing the one or more locking conditions; display the fourth graphical user interface on the display; receive user input indicating changes to the one or more locking conditions; and transmit one or more revised locking conditions to the card.

Clause 8: The computing device of clause 7, wherein the one or more locking conditions comprise an unlock time period, a location-based unlock area, a unlock distance from computing device, an unpairing of the card from the computer device, and an authorization of a transaction via the card.

Clause 9: The computing device of clause 8, wherein the memory stores further instructions that are configured to cause the computing device to: dynamically change the one or more locking conditions using a machine learning model trained from a routine of the user.

Clause 10: A card comprising: one or more antennas; one or more processors; memory in communication with the one or more processors and storing instructions that are configured to cause the card to: establish a connection with a mobile device via the one or more antennas; receive, from the mobile device, a first signal to change the card to an unlocked state capable of conducting a transaction from a default locked state incapable of conducting a transaction; responsive to receiving the first signal to change the card to the unlocked state, change the card from the default locked state to the unlocked state; determine whether a trigger event has occurred; responsive to determining that the trigger event has occurred, change to the card to the default locked state; otherwise, maintain the card in the unlocked state, where in the card: receives, from a first transaction terminal, a first transfer request; and transmits, to the first transaction terminal, a transfer authorization.

Clause 11: The card of clause 10, wherein the transfer authorization is the trigger event and responsive to transmitting the transfer authorization, the card changes from the unlocked state to the default locked state.

Clause 12: The card of clause 10, wherein the trigger event is when an amount of time has elapsed since the first signal is greater than a first preset threshold.

Clause 13: The card of clause 10, wherein the trigger event is when the card has lost contact with the mobile device, wherein determining that the card has lost contact with the mobile device further comprises: transmit, to the mobile device, a request for information; and determine that an amount of time has elapsed since the request for information that is greater than a second preset threshold.

Clause 14: The card of clause 10, wherein the trigger event is when a location of the mobile device is greater than a maximum distance threshold from the location of the card.

Clause 15: The card of clause 10, wherein the trigger event is receiving a second signal from the mobile device to change the card to the default locked state.

Clause 16: The card of clause 10, wherein the memory stores further instructions that are configured to cause the card to: receive, from a second transaction terminal, a second transfer request; and responsive to the card being in the default locked state, deny the second transfer request.

Clause 17: The card of clause 10, wherein the memory stores further instructions that are configured to cause the card to: receive, from the mobile device, a second signal to change the card to the unlocked state; responsive to receiving the second signal to change the card to the unlocked state, change the card from the default locked state to the unlocked state; receive, from a second transaction terminal, a second transfer request; responsive to the card being in the unlocked state, transmit, to the second transaction terminal, a second transfer authorization; and responsive to transmitting the second transfer authorization, change the card from the unlocked state to the default locked state.

Clause 18: A card comprising: one or more antennas; one or more processors; memory in communication with the one or more processors and storing instructions that are configured to cause the card to: establish a connection with a mobile device via the one or more antennas; receive, from the mobile device, a first signal to change the card to an unlocked state capable of conducting a transaction from a default locked state incapable of conducting a transaction; responsive to receiving the first signal to change the card to the unlocked state, change the card from the default locked state to the unlocked state; receive, from a first transaction terminal, a first transfer request; responsive to the card being in the unlocked state, transmit, to the first transaction terminal, a transfer authorization; and responsive to transmitting the transfer authorization, change the card from the unlocked state to the default locked state.

Clause 19: The card of clause 18, wherein the memory stores further instructions that are configured to cause the card to: determine whether a trigger event has occurred; and responsive to determining that the trigger event has occurred, change the card to the default locked state.

Clause 20: The card of clause 19, wherein the memory stores further instructions that are configured to cause the card to: responsive to determining that the trigger event has occurred, transmit, to the mobile device, a second signal indicating the trigger event has occurred.

Clause 21: A first card comprising: one or more antennas; one or more processors; memory in communication with the one or more processors and storing instructions that are configured to cause the first card to: receive, from a second card, the second card associated with a same account as the first card, a first signal and a gesture, wherein the first signal comprising authorization information relating to account information; authenticate the first signal using the account information; determine, from the gesture and the account information, authorization conditions; change an authorization limitation of the first card based on the authorization conditions; receive, from a first terminal, a first transfer request; and responsive to the first card having the authorization limitation, transmit, to the first terminal, a transfer authorization.

Clause 22: The first card of clause 21, wherein the first card belongs to a secondary user of the account and the second card belongs to a primary user of the account.

Clause 23: The first card of clause 21, wherein the change in the authorization limitation is an increase or a decrease in a spending limit.

Clause 24: The first card of clause 21, wherein the change in the authorization limitation is an increase or a decrease in an available card usage time for authorizing the transfer on the second card.

Clause 25: The first card of clause 21, wherein the increase in authorization limitation is related to a specific item, a vendor, or combinations thereof.

Clause 26: The first card of clause 21, wherein the gesture is a tap or multiple taps.

Clause 27: The first card of clause 26, wherein the tap indicates an increase in the authorization limitation of a first predetermined amount, and each additional tap adds the first predetermined amount to the authorization limitation.

Clause 28: The first card of clause 21, wherein the gesture comprises a tap, a swipe, or combinations thereof.

Clause 29: The first card of clause 28, wherein the tap corresponds to increasing the authorization limitation and the swipe corresponds to decreasing the authorization limitation.

Clause 30: The first card of clause 28, wherein the tap indicates a first increase in the authorization limitation of a first predetermined amount, and the swipe indicates a second increase in the authorization limitation of a second predetermined amount.

Clause 31: The first card of clause 28, wherein an orientation of the first card during the gesture determines if the authorization limitation is increased or decreased.

Clause 32: A computing device comprising: a display; one or more processors; a memory in communication with the one or more processors and storing instructions that are configured to cause the computing device to: generate a first graphical user interface asking a user to set authorization conditions for a card related to an account; display the first graphical user interface on the display of the computing device; receive, from a first user, authorization conditions and a selection of a gesture from one or more gestures; generate a second graphical user interface, showing the authorization conditions, the authorization conditions indicating an authorization limitation for the card; display the second graphical user interface on the display; detect a first gesture; identify whether the first gesture corresponds to the gesture selected; and responsive to identifying the first gesture corresponds with the selected gesture, transmit the authorization conditions to the card.

Clause 33: The computing device of clause 32, wherein the memory stores further instructions that are configured to cause the computing device to: generate a third graphical user interface showing that the authorization conditions transmitted to the card as a result of the gesture; and display the third graphical user interface on the display.

Clause 34: The computing device of clause 32, wherein the memory stores further instructions that are configured to cause the computing device to: generate a message to send to a mobile device of a second user, the second user being associated with the card; and transmit the message to the mobile device of the second user.

Clause 35: The computing device of clause 32, wherein the authorization limitation is limited to a certain vendor as specified by the authorization conditions chosen by the first user.

Clause 36: The computing device of clause 32, wherein the selected gesture is associated with different categories of authorization conditions.

Clause 37: The computing device of clause 32, wherein the first graphical user interface comprises the one or more gestures to select and a prompt for user input for the authorization conditions, wherein the user input associates the authorization conditions to the selected one or more gestures.

Clause 38: The computing device of clause 32, wherein the selected gesture of the one or more gestures associated with a first authorization condition increases the authorization limitation and a second gesture of the one or more gestures associated with a second authorization condition decreases the authorization limitation.

Clause 39: A first computing device comprising: one or more processors; a memory in communication with the one or more processors and storing instructions that are configured to cause the first computing device to: receive, from a second computing device, the second computing device associated with a same account as the first computing device, a first signal and a gesture, wherein the first signal comprising authorization information relating to account information; send, to a server, the gesture and the account information; receive, from the server, first authorization conditions and a first authorization limitation; receive, from a first terminal, a first transfer request; and responsive to the first computing device having the necessary authorization limitation, transmit, to the first terminal, a first transfer authorization.

Clause 40: The first computing device of clause 39, wherein the memory stores further instructions that are configured to cause the first computing device to: receive, from the server, second authorization conditions and a second authorization limitation; receive, from a second terminal, a second transfer request; and responsive to the first computing device having the second authorization limitation, transmit, to the second terminal, a second transfer authorization.

Clause 41: A card comprising: one or more antennas; one or more processors; memory in communication with the one or more processors and storing instructions that are configured to cause the card to: receive, from a first user device associated with a same account as the card, first gesture data; determine whether the first gesture data matches a first stored gesture of one or more stored gestures; responsive to determining that the first gesture data matches the first stored gesture: receive, from the first user device, configuration information relating to predebited virtual card information and a second stored gesture; receive, second gesture data from a second user device; determine whether the second gesture data matches the second stored gesture of the one or more stored gestures; and responsive to determining that the second gesture data matches the second stored gesture:

transmit, to the second user device, the predebited virtual card information based on the configuration information.

Clause 42: The card of clause 41, wherein when the predebited virtual card information is transmitted to the second user device, an amount is debited from the account associated with the card.

Clause 43: The card of clause 41, wherein the first stored gesture is a tap. Clause 44: The card of clause 41, wherein the second stored gesture is a tap.

Clause 45: The card of clause 41, wherein the predebited virtual card information comprises a virtual card number.

Clause 46: The card of clause 41, wherein the predebited virtual card information comprises an amount limit, a time limit, a transaction number limit, or combinations thereof.

Clause 47: A first computing device comprising: one or more sensors; one or more processors; memory in communication with the one or more processors and storing instructions that are configured to cause the first computing device to: generate a first graphical user interface indicating for a first user to select configuration information associated with an account of the first user comprising predebited virtual card information, a card amount, and one or more stored gestures; display, the first graphical user interface on a display; receive, from the first user, the configuration information; receive, from the one or more sensors, first gesture data; determine, that the first gesture data matches a stored gesture of the one or more stored gestures; responsive to determining that the first gesture data matches the stored gesture: transmit, to a second computing device associated with a second user, the predebited virtual card information; and transmit, to a server, the predebited virtual card information comprising the card amount to be charged to the account.

Clause 48: The first computing device of clause 47, wherein the memory stores further instructions that are configured to cause the first computing device to: receive, from the server, a first message that a predebited virtual card is activated and the card amount has been debited from the account; generate a second graphical user interface for displaying the first message; and display the second graphical user interface on the display.

Clause 49: The first computing device of clause 48, wherein the memory stores further instructions that are configured to cause the first computing device to: receive, from the server, a second message that the predebited virtual card has been charged for a first amount; generate a third graphical user interface for displaying the second message; and display the third graphical user interface on the display.

Clause 50: The first computing device of clause 49, wherein the memory stores further instructions that are configured to cause the first computing device to: determine a current balance by subtracting the first amount from the card amount; generate a fourth graphical user interface for displaying the current balance; and display the fourth graphical user interface on the display.

Clause 51: The first computing device of clause 48, wherein the configuration information further comprises a transaction limit and a time limit, and wherein the memory stores further instructions that are configured to cause the first computing device to: receive, from the first user, a request to view the configuration information; generate a fifth graphical user interface displaying the card amount, the transaction limit, and the time limit; and display the fifth graphical user interface on the display.

Clause 52: The first computing device of clause 51, wherein the memory stores further instructions that are configured to cause the first computing device to: receive, from the first user, altered configuration information; transmit, to the server, the altered configuration information; generate a sixth graphical user interface displaying the altered configuration information; and display the sixth graphical user interface on the display.

Clause 53: The first computing device of clause 52, wherein the altered configuration information is an increase in the card amount.

Clause 54: The first computing device of clause 48, wherein the memory stores further instructions that are configured to cause the first computing device to: receive, from the first user, a third message to deactivate the predebited virtual card; transmit, to the server, the third message; receive, from the server, a fourth message indicating that the predebited virtual card is deactivated; generate a seventh graphical user interface displaying that the predebited virtual card is deactivated; and display the seventh graphical user interface on the display.

Clause 55: A computing device of a first user comprising: one or more processors; memory in communication with the one or more processors and storing instructions that are configured to cause the computing device to: receive, from a card associated with an account of a second user, predebited virtual card information comprising an amount; send, to a server, the predebited virtual card information for activating a predebited virtual card associated with the predebited virtual card information; receive, from the server, authorization information regarding the amount; generate a first graphical user interface showing the predebited virtual card information, the authorization information, and the amount; display the first graphical user interface on a display; receive, from a first terminal, a first transfer request; and transmit, to the first terminal, a first transfer authorization.

Clause 56: The computing device of the first user of clause 55, wherein the memory stores further instructions that are configured to cause the computing device to: generate a second graphical user interface showing updated predebited virtual card information, the authorization information, and the amount in response to the first transfer authorization; and display the second graphical user interface on the display.

Clause 57: The computing device of the first user of clause 55, wherein the first user receives an indication when the first transfer authorization is transmitted.

Clause 58: The computing device of the first user of clause 55, wherein the second user receives an indication when the first transfer authorization is transmitted.

Clause 59: The computing device of the first user of clause 55, wherein the memory stores further instructions that are configured to cause the computing device to: receive, from the card, first gesture data; determine whether the first gesture data matches a first stored gesture of one or more stored gestures; responsive to determining that the first gesture data matches the first stored gesture: generate a third graphical user interface showing updated predebited virtual card information, the authorization information, and the amount; and display the third graphical user interface on the display.

Clause 60: The computing device of the first user of clause 55, wherein the memory stores further instructions that are configured to cause the computing device to: receive, from the card, second gesture data; determine whether the second gesture data matches a second stored gesture of one or more stored gestures; and responsive to determining that the second gesture data matches the second stored gesture: transmit a message to the server to deactivate the predebited virtual card.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A first card comprising:
   one or more antennas;
   one or more processors;
   memory in communication with the one or more processors and storing instructions that are configured to cause the first card to:
      receive, from a second card, the second card associated with a same account as the first card, a first signal and a gesture, wherein the first signal comprising authorization information relating to account information;
      authenticate the first signal using the account information;
      determine, from the gesture and the account information, authorization conditions;
      change an authorization limitation of the first card based on the authorization conditions;
      receive, from a first terminal, a first transfer request; and
      responsive to the first card having the authorization limitation, transmit, to the first terminal, a transfer authorization.

2. The first card of claim 1, wherein the first card belongs to a secondary user of the account and the second card belongs to a primary user of the account.

3. The first card of claim 1, wherein the change in the authorization limitation is an increase or a decrease in a spending limit.

4. The first card of claim 1, wherein the change in the authorization limitation is an increase or a decrease in an available card usage time for authorizing the transfer on the second card.

5. The first card of claim 1, wherein the increase in authorization limitation is related to a specific item, a vendor, or combinations thereof.

6. The first card of claim 1, wherein the gesture is a tap or multiple taps.

7. The first card of claim 6, wherein the tap indicates an increase in the authorization limitation of a first predetermined amount, and each additional tap adds the first predetermined amount to the authorization limitation.

8. The first card of claim 1, wherein the gesture comprises a tap, a swipe, or combinations thereof.

9. The first card of claim 8, wherein the tap corresponds to increasing the authorization limitation and the swipe corresponds to decreasing the authorization limitation.

10. The first card of claim 8, wherein the tap indicates a first increase in the authorization limitation of a first predetermined amount, and the swipe indicates a second increase in the authorization limitation of a second predetermined amount.

11. The first card of claim 8, wherein an orientation of the first card during the gesture determines if the authorization limitation is increased or decreased.

12. A computing device comprising:
   a display;
   one or more processors;
   a memory in communication with the one or more processors and storing instructions that are configured to cause the computing device to:
      generate a first graphical user interface asking a user to set authorization conditions for a card related to an account;
      display the first graphical user interface on the display of the computing device;
      receive, from a first user, authorization conditions and a selection of a gesture from one or more gestures;
      generate a second graphical user interface, showing the authorization conditions, the authorization conditions indicating an authorization limitation for the card;
      display the second graphical user interface on the display;
      detect a first gesture;
      identify whether the first gesture corresponds to the gesture selected; and
      responsive to identifying the first gesture corresponds with the selected gesture, transmit the authorization conditions to the card.

13. The computing device of claim 12, wherein the memory stores further instructions that are configured to cause the computing device to:
   generate a third graphical user interface showing that the authorization conditions transmitted to the card as a result of the gesture; and
   display the third graphical user interface on the display.

14. The computing device of claim 12, wherein the memory stores further instructions that are configured to cause the computing device to:
   generate a message to send to a mobile device of a second user, the second user being associated with the card; and
   transmit the message to the mobile device of the second user.

15. The computing device of claim 12, wherein the authorization limitation is limited to a certain vendor as specified by the authorization conditions chosen by the first user.

16. The computing device of claim 12, wherein the selected gesture is associated with different categories of authorization conditions.

17. The computing device of claim 12, wherein the first graphical user interface comprises the one or more gestures to select and a prompt for user input for the authorization conditions, wherein the user input associates the authorization conditions to the selected one or more gestures.

18. The computing device of claim 12, wherein the selected gesture of the one or more gestures associated with a first authorization condition increases the authorization limitation and a second gesture of the one or more gestures associated with a second authorization condition decreases the authorization limitation.

19. A first computing device comprising:
   one or more processors;
   a memory in communication with the one or more processors and storing instructions that are configured to cause the first computing device to:
      receive, from a second computing device, the second computing device associated with a same account as the first computing device, a first signal and a gesture, wherein the first signal comprising authorization information relating to account information;
      send, to a server, the gesture and the account information;
      receive, from the server, first authorization conditions and a first authorization limitation;
      receive, from a first terminal, a first transfer request; and
      responsive to the first computing device having the necessary authorization limitation, transmit, to the first terminal, a first transfer authorization.

20. The first computing device of claim 19, wherein the memory stores further instructions that are configured to cause the first computing device to:
   receive, from the server, second authorization conditions and a second authorization limitation;
   receive, from a second terminal, a second transfer request; and
   responsive to the first computing device having the second authorization limitation, transmit, to the second terminal, a second transfer authorization.

* * * * *